United States Patent
Yokobori

(10) Patent No.: US 10,638,573 B2
(45) Date of Patent: Apr. 28, 2020

(54) LIGHTING TOOL FOR VEHICLE, ILLUMINATION SYSTEM AND LAMP CONTROL METHOD

(71) Applicant: STANLEY ELECTRIC CO., LTD., Tokyo (JP)

(72) Inventor: Toshio Yokobori, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/414,246

(22) Filed: May 16, 2019

(65) Prior Publication Data
US 2019/0364648 A1 Nov. 28, 2019

(30) Foreign Application Priority Data
May 22, 2018 (JP) .................. 2018-098054

(51) Int. Cl.
| | | |
|---|---|---|
| H05B 37/02 | (2006.01) | |
| B60Q 1/04 | (2006.01) | |
| H02J 50/12 | (2016.01) | |
| B60L 1/00 | (2006.01) | |
| B60Q 1/00 | (2006.01) | |

(52) U.S. Cl.
CPC ....... H05B 37/0272 (2013.01); B60Q 1/0088 (2013.01); H02J 50/12 (2016.02); B60Q 2900/30 (2013.01)

(58) Field of Classification Search
CPC .. H05B 37/02; H05B 37/0272; B60Q 1/0088; B60Q 1/04; B60Q 2900/30; H02J 50/12; B60L 1/00; B60L 1/14
See application file for complete search history.

(56) References Cited

U.S. PATENT DOCUMENTS

| | | | | |
|---|---|---|---|---|
| 9,713,233 B1* | 7/2017 | Castillo | ............... | B60Q 1/0088 |
| 9,923,417 B2* | 3/2018 | Kamata | .................. | H02J 7/045 |
| 2005/0200287 A1* | 9/2005 | Ito | ........................ | B60Q 11/005 315/82 |
| 2009/0212781 A1* | 8/2009 | Bertness | ............... | G06Q 99/00 324/426 |
| 2011/0018441 A1* | 1/2011 | Tanaka | ................ | B60Q 1/0094 315/82 |
| 2013/0020937 A1* | 1/2013 | Tatara | ................. | B60Q 1/0094 315/77 |

FOREIGN PATENT DOCUMENTS

JP 2013-23077 A 2/2013

* cited by examiner

*Primary Examiner* — Thai Pham
(74) *Attorney, Agent, or Firm* — Kenealy Vaidya LLP

(57) ABSTRACT

Provided is a lighting tool for a vehicle including a first power supply, and a lamp for a vehicle operated with electric power supplied from the first power supply, a detection unit that detects a waveform of first electric power, a generation unit that generates a first control signal that is a signal controlling the lamp for a vehicle according to the waveform of the detected first electric power, an output control unit that superimposes the first control signal on the first electric power and wirelessly transmit the signal obtained by the superimposition from a power transmission section, a conversion unit that acquires a second control signal based on the signal received by a power receiving section that receives the signal wirelessly transmitted from the power transmission section, and a lamp control unit that controls the lamp for a vehicle according to the second control signal.

8 Claims, 10 Drawing Sheets

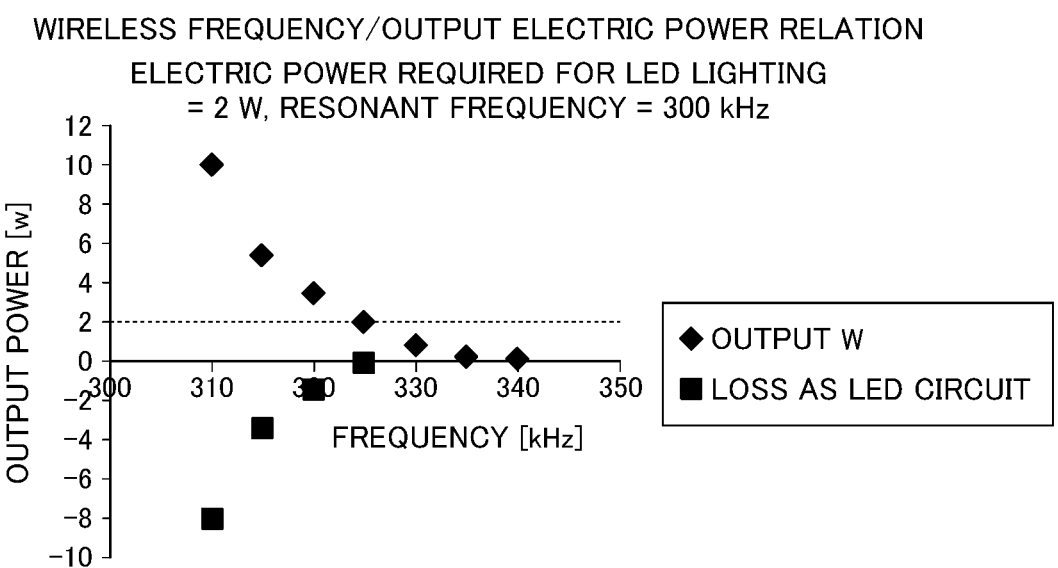

FIG. 10
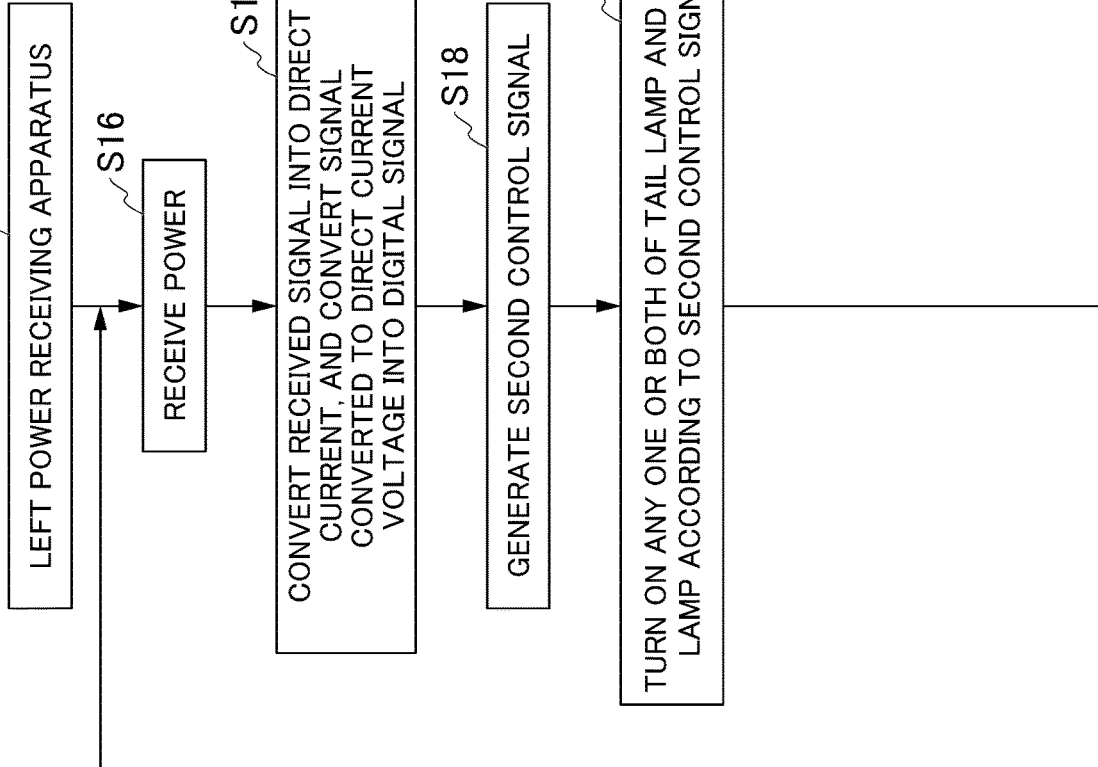
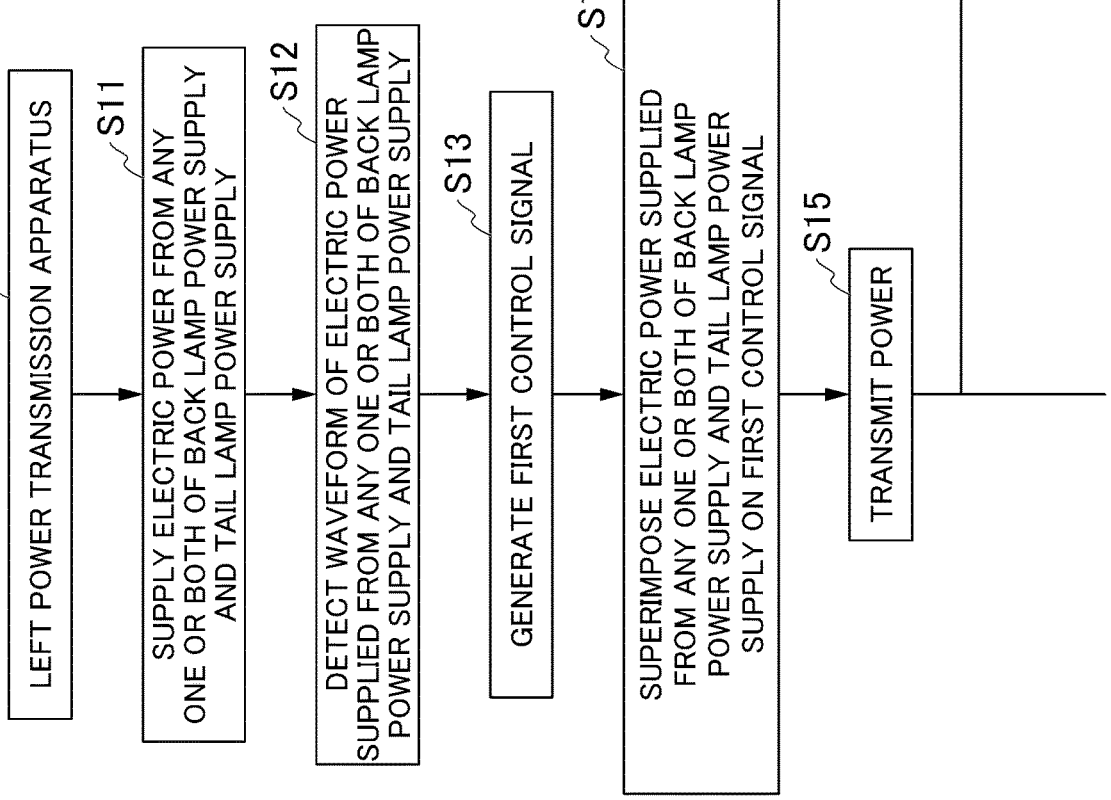

LIGHTING TOOL FOR VEHICLE, ILLUMINATION SYSTEM AND LAMP CONTROL METHOD

CROSS-REFERENCE TO RELATED APPLICATION

Priority is claimed on Japanese Patent Application No. 2018-098054, filed May 22, 2018, the content of which is incorporated herein by reference.

BACKGROUND OF THE INVENTION

Field of the Invention

The present invention relates to a lighting tool for a vehicle, an illumination system, and a lamp control method.

Description of Related Art

It is conceivable that a communication function be provided in a wireless power supply system.

When the communication function is provided by adding a communication circuit to a wireless power supply system, a circuit configuration becomes complicated, and the number of parts is increased.

In addition, in a wireless power supply system configured to perform wireless power supply using a single coil, electric power line carrier communication that performs signal transmission is performed by superimposing a communication waveform on an alternating current waveform using an electric power line as a communication line. The electric power line carrier communication is also referred to as electric power line communication, high speed electric power line communication, electric lamp line communication, power line communication (PLC), or power line telecommunication (PLT).

In a Qi specification that is an international standard specification of wireless power supply, it is defined that unidirectional communication is performed through 2-value amplitude-shift keying (ASK) by varying a load on a power receiving side.

As a technology of feeding power to a lamp for a vehicle, a power supply apparatus configured to increase electrical and mechanical reliability of a power supply section of a lamp for a vehicle is known (for example, see Japanese Unexamined Patent Application, First Publication No. 2013-23077). In this technology, a power supply apparatus configured to feed electric power from a battery BAT mounted on the vehicle to a lamp RCL disposed on the vehicle is constituted by a power transmission section configured to transmit electric power of the battery BAT provided on the vehicle, and a power receiving section integrally provided on the lamp RCL and configured to receive electric power from the power transmission section.

In addition, for a lamp for a vehicle, a technology of performing wireless transmission and wireless power supply is known (for example, see U.S. Pat. No. 9,713,233).

SUMMARY OF THE INVENTION

In the Qi specification, it is only defined that feedback from the power receiving side is performed, and it is not defined that a signal is transmitted from the power transmission side to the power receiving side. When a signal is transmitted from the power transmission side to the power receiving side, it is assumed that the signal is transmitted through infrared communication or Bluetooth (Registered trademark). However, when infrared communication or Bluetooth is used, additional parts are required.

In addition, when the signal is transmitted from the power transmission side to the power receiving side, noise may be generated and a stable operation may not be able to be performed. In addition, when the signal is transmitted from the power transmission side to the power receiving side, if there is no feedback from the power receiving side, regardless of a magnitude of a load, the power transmission side will continue to transmit a large amount of electric power, and the power consumption will be high.

An aspect of the present invention is directed to providing a lighting tool for a vehicle, an illumination system, and a lamp control method that are capable of performing signal transmission from a power transmission section configured to transmit power to a power receiving section configured to receive power using a wireless power supply system.

An aspect of the present invention is a lighting tool for a vehicle including: a first power supply mounted on a vehicle; a lamp for a vehicle attached to the vehicle and operated with electric power supplied from the first power supply; a detection unit configured to detect a waveform of first electric power supplied from the first power supply; a generation unit configured to generate a first control signal that is a signal controlling the lamp for a vehicle according to the waveform of the first electric power detected by the detection unit; an output control unit configured to superimpose the first control signal generated by the generation unit on the first electric power supplied from the first power supply and wirelessly transmit the signal obtained by the superimposition from a power transmission section; a conversion unit configured to acquire a second control signal based on the signal received by a power receiving section configured to receive the signal wirelessly transmitted from the power transmission section provided on the lamp for a vehicle; and a lamp control unit configured to control the lamp for a vehicle according to the second control signal acquired by the conversion unit.

According to an aspect of the present invention, in the lighting tool for a vehicle, a configuration in which a second power supply is provided, the detection unit detects either one or both of the waveform of the first electric power supplied from the first power supply and a waveform of second electric power supplied from the second power supply, the generation unit generates the first control signal according to either one or both of the waveform of the first electric power and the waveform of the second electric power detected by the detection unit, and the output control unit superimposes the first control signal generated by the generation unit on either one or both of the first electric power and the second electric power may be used.

According to an aspect of the present invention, in the lighting tool for a vehicle, a configuration in which the output control unit generates a first control signal having different frequency components according to either one or both of the waveform of the first electric power and the waveform of the second electric power detected by the detection unit may be used.

According to an aspect of the present invention, in the lighting tool for a vehicle, a configuration in which the output control unit generates first control information having a frequency component determined according to power consumption of the lamp for a vehicle may be used.

According to an aspect of the present invention, in the lighting tool for a vehicle, a configuration in which the output control unit generates the first control signal having different amplitudes according to either one or both of the waveform of the first electric power and the waveform of the second electric power detected by the detection unit may be used.

According to an aspect of the present invention, in the lighting tool for a vehicle, a configuration in which the output control unit generates the first control signal having an amplitude determined according to power consumption of the lamp for a vehicle may be used.

An aspect of the present invention is an illumination system configured to operate a lamp for a vehicle using electric power supplied from a power supply mounted on a vehicle, the illumination system including: a detection unit configured to detect a waveform of electric power supplied from the power supply; a generation unit configured to generate a first control signal that is a signal controlling the lamp for a vehicle according to the waveform of the electric power detected by the detection unit; an output control unit configured to superimpose the first control signal generated by the generation unit on the electric power supplied from the power supply and wirelessly transmit the signal obtained by the superimposition from a power transmission section; a conversion unit configured to acquire a second control signal from the signal received by a power receiving section configured to receive the signal wirelessly transmitted from the power transmission section provided on the lamp for a vehicle; and a lamp control unit configured to control the lamp for a vehicle according to the second control signal acquired by the conversion unit.

An aspect of the present invention is a lamp control method performed by an illumination system configured to operate a lamp for a vehicle using electric power supplied from a power supply mounted on a vehicle, the lamp control method including: detecting a waveform of electric power supplied from the power supply; generating a first control signal that is a signal controlling the lamp for a vehicle according to the waveform of the electric power detected in the detecting step; superimposing the first control signal generated in the generating step on the electric power supplied from the power supply; wirelessly transmitting a signal obtained by the superimposing step; receiving the signal wirelessly transmitted in the wirelessly transmitting step; acquiring a second control signal based on the signal received in the receiving step; and controlling the lamp for a vehicle according to the second control signal acquired by the acquiring step.

According to the aspects of the present invention, it is possible to provide a lighting tool for a vehicle, an illumination system and a lamp control method that are capable of performing signal transmission from a power transmission section configured to transmit power to a power receiving section configured to receive power using a wireless power supply system.

BRIEF DESCRIPTION OF THE DRAWINGS

FIG. 6 is a view showing an example of a relation between a frequency and an output electric power.

FIG. 10 is a sequence chart showing an example of an operation of the lighting tool for a vehicle according to the second embodiment.

DETAILED DESCRIPTION OF THE INVENTION

Figure 1:
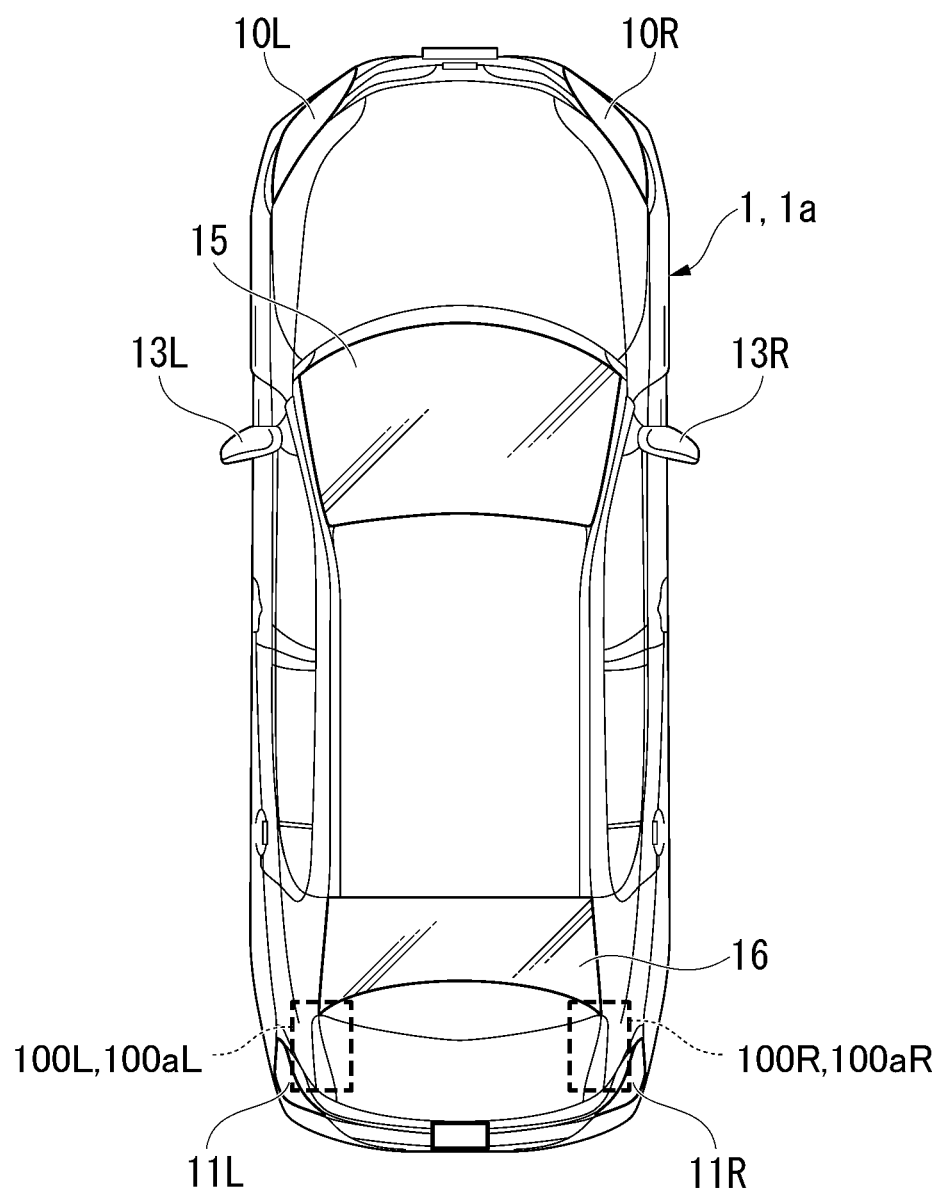
FIG. 1 is a view showing a schematic configuration of an automobile according to a first embodiment.

Next, a lighting tool for a vehicle, an illumination system, and a lamp control method according to embodiments will be described with reference to the accompanying drawings. The embodiments described below are merely examples, and the embodiments to which the present invention is applied are not limited to the following embodiments.

Further, in all of the drawings for describing the embodiments, components having the same function are designated by the same reference numerals, and repeated description thereof will be omitted.

In addition, "based on XX" disclosed herein means "based on at least XX" and also includes a case based on another element in addition to XX. In addition, "based on XX" is not limited to a case in which XX is directly used and also includes a case in which calculation or processing is performed with respect to XX.

"XX" is an arbitrary element (for example, arbitrary information).

Hereinafter, embodiments of the present invention will be described with reference to the accompanying drawings.

First Embodiment

A lighting tool for a vehicle according to a first embodiment is mounted on a vehicle. In the first embodiment, while an automobile is shown an example of the vehicle, a motorcycle, a bicycle, a microminiature mobility, a personal mobility, or the like, may be provided as the vehicle.

[Schematic Configuration of Automobile 1]

FIG. 1 is a view showing a schematic configuration of an automobile 1 according to the first embodiment.

The automobile 1 includes a headlight on a left side (in the embodiment, referred to as a left headlight section 10L), a headlight on a right side (in the embodiment, referred to as a right headlight section 10R), a taillight on a left side (in the embodiment, referred to as a left taillight section 11L), a taillight on a right side (in the embodiment, referred to as a right taillight section 11R), a side mirror on a left side (in the embodiment, referred to as a left side mirror 13L), a side mirror on a right side (in the embodiment, referred to as a right side mirror 13R), a front window 15, and a rear window 16.

The left headlight section 10L is disposed on a left side of a front side of the automobile 1, and the right headlight section 10R is disposed on a right side of the front side of the automobile 1.

The left taillight section 11L is disposed on a left side of a rear side of the automobile 1, and the right taillight section 11R is disposed on a right side of the rear side of the automobile 1.

In addition, the automobile 1 includes a lighting tool for a vehicle. The lighting tool for a vehicle includes a left lighting tool 100L for a vehicle and a right lighting tool 100R for a vehicle. The left lighting tool 100L for a vehicle is disposed on a left side of a rear side of the automobile 1, and the right lighting tool 100R for a vehicle is disposed on a right side of the rear side of the automobile 1.

Here, in the first embodiment, while a part of a configuration section of the automobile 1 has been shown, for example, in addition to this, the automobile 1 may include an arbitrary configuration section such as another configuration section or the like conventionally included in a general automobile.

In addition, each of the left lighting tool 100L for a vehicle and the right lighting tool 100R for a vehicle includes a lamp for a vehicle and an illumination system. The illumination system may be provided in the automobile 1 without being visible from outside of the automobile 1.

Figure 2:
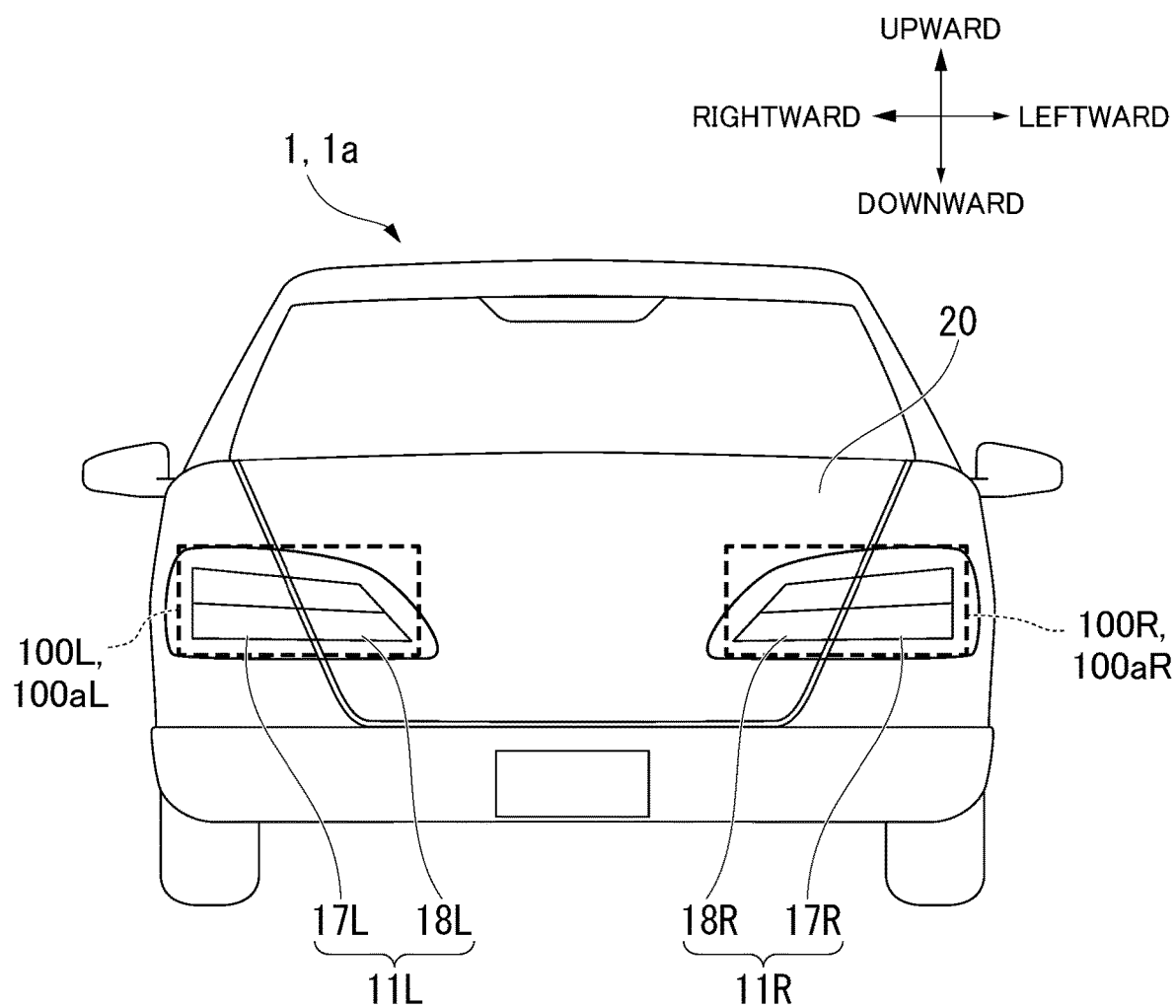
FIG. 2 is a view showing a rear portion of the automobile, on which a lighting tool for a vehicle according to the first embodiment is mounted.

FIG. 2 is a view showing a rear portion of the automobile 1 on which the lighting tool for a vehicle according to the first embodiment is mounted. As shown in FIG. 2, the automobile 1 includes the left taillight section 11L and the right taillight section 11R.

The left taillight section 11L is disposed on the left side of the rear section of the automobile 1, and mainly emits light toward a side to the rear of the automobile 1. The right taillight section 11R is disposed on a right side of the rear section of the automobile 1, and mainly emits light toward a side to the rear of the automobile 1.

The left taillight section 11L includes a left rear combination lamp 17L disposed on the automobile 1, and a left LID lamp 18L disposed on a trunk 20 with the left rear combination lamp 17L.

The left rear combination lamp 17L is a lamp for a left rear side, which is obtained by integrally assembling a left tail lamp (a taillight), a left stop lamp (a brake lamp), a left rear reflector, and a left turn light (a direction indicator lamp). The left rear reflector is configured to reflect light illuminated by a headlight of a following vehicle, and the light glows red. Accordingly, attention can be drawn even when the lamp is turned off upon parking or stopping at nighttime. The left tail lamp (taillight), the left stop lamp (brake lamp) and the left turn lamp (direction indicator lamp) will be described below.

The left LID lamp 18L is a lamp for a rear side in which a left tail lamp (taillight) and a left back lamp (backup light) are integrally assembled. The left tail lamp (taillight) and the left back lamp (backup light) will be described below.

The right taillight section 11R includes a right rear combination lamp 17R disposed on the automobile 1, and a right LID lamp 18R disposed on the trunk 20 with the right rear combination lamp 17R.

The right rear combination lamp 17R is a lamp for a right rear side, which is obtained by integrally assembling a right tail lamp (taillight), a right stop lamp (brake lamp), a right rear reflector, and a right turn lamp (direction indicator lamp). The right rear reflector is configured to reflect light illuminated by a headlight of a following vehicle, and the light glows red. Accordingly, attention can be drawn even when the lamp is turned off upon parking or stopping at nighttime. The right tail lamp (taillight), the right stop lamp (brake lamp) and the right turn lamp (direction indicator lamp) will be described below.

The right LID lamp 18R is a lamp for a rear side, which is obtained by integrally assembling a right tail lamp (taillight), a right back lamp (backup light), and the like. The right tail lamp (taillight) and the right back lamp (backup light) will be described below.

Figure 3:
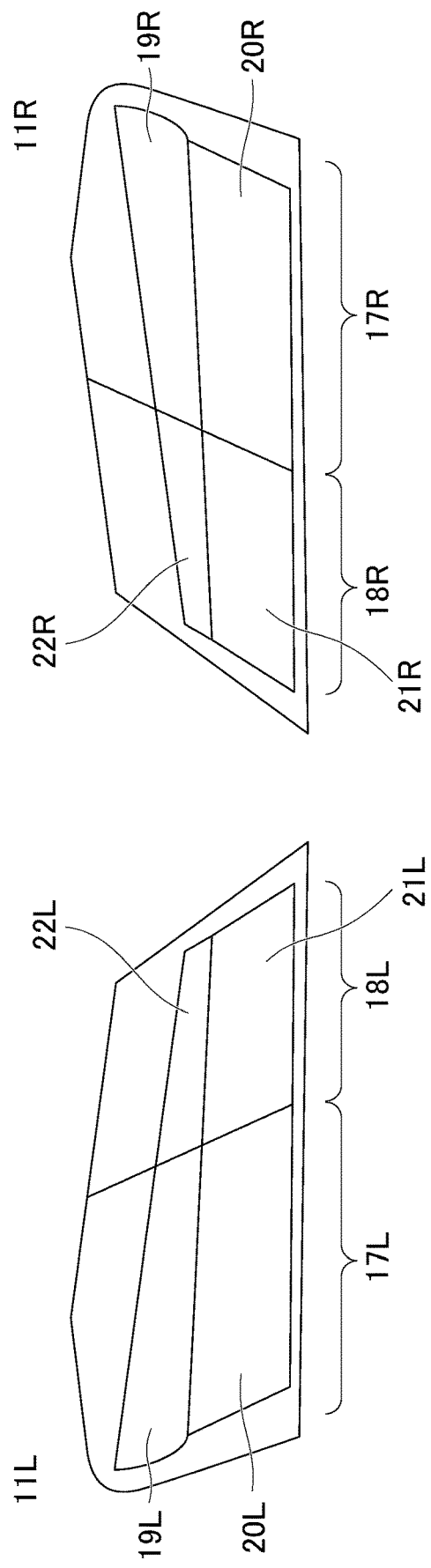
FIG. 3 is a view showing an example of a left taillight section and a right taillight section of the automobile according to the first embodiment.

FIG. 3 is a view showing an example of the left taillight section 11L and the right taillight section 11R of the automobile 1 according to the first embodiment.

As shown in a left view in FIG. 3, in the left taillight section 11L, the left rear combination lamp 17L includes a left turn light 19L and a left tail/stop lamp 20L. The left turn light 19L is a light configured to show a direction upon a left turn or a change of course to the surroundings. The left tail/stop lamp 20L is a lamp obtained by integrally assembling a lamp (a left tail lamp) configured to inform a following vehicle of a vehicle traveling in front at nighttime or in bad weather, and a lamp (a left stop lamp) configured to turn on a lamp on a left rear part when a brake of the automobile 1 is operated.

The left LID lamp 18L includes a left back lamp 22L and a left tail lamp 21L. The left back lamp 22L is a lamp configured to inform a following automobile that the automobile 1 is moving backward by emitting white light when a gear enters a reverse range to move the automobile 1 backward. The left back lamp 22L is configured to include a light emitting diode (LED). In the embodiment, description of the case in which power consumption of the left back lamp 22L is 3 W will be continued. The left tail lamp 21L is a lamp configured to notify a following vehicle of a vehicle traveling in front at nighttime or in bad weather. The left tail lamp 21L is configured to include an LED. In the embodiment, description of the case in which power consumption of the left tail lamp 21L is 32 W will be continued.

The left lighting tool 100L for a vehicle according to the first embodiment includes a left power transmission apparatus and a left power receiving apparatus. The left power transmission apparatus includes the left rear combination lamp 17L, and the left power receiving apparatus includes the left LID lamp 18L. The left lighting tool 100L for a vehicle performs the following processing when any one or the two of the left tail lamp 21L of the left LID lamp 18L and the left back lamp 22L provided in the left power receiving apparatus is turned on.

The left lighting tool 100L for a vehicle detects a waveform of electric power supplied from either one or both of a tail lamp power supply TPSL configured to turn on the left tail lamp 21L and a back lamp power supply BPSL configured to turn on the left back lamp 22L in the left power transmission apparatus.

The left lighting tool 100L for a vehicle generates a first control signal to turn on either one or both of the left tail lamp 21L and the left back lamp 22L on the basis of the detected waveform in the left power transmission apparatus. The left lighting tool 100L for a vehicle superimposes a first control signal, which is generated, and electric power supplied from either one or both of the tail lamp power supply TPSL and the back lamp power supply BPSL in the left power transmission apparatus, and wirelessly transmits the signal obtained by superimposition.

The left lighting tool 100L for a vehicle receives the signal wirelessly transmitted by the left power transmission apparatus, converts the received signal, and thus, obtains a second control signal in the left power receiving apparatus. Here, the second control signal may be the same as or may be different from the first control signal. While the second control signal is the same as the first control signal when the signal transmitted by the left power transmission apparatus is received without problem, the second control signal may be different from the first control signal when there is a problem. The left lighting tool 100L for a vehicle performs control of turning on either one or both of the left tail lamp 21L and the left back lamp 22L according to the acquired second control signal in the left power receiving apparatus.

As shown in a right view of FIG. 3, in the right taillight section 11R, the right rear combination lamp 17R includes a right turn light 19R and a right tail/stop lamp 20R. The right turn light 19R is a light configured to show a direction thereof upon a right turn or a change of course to the surroundings. The right tail/stop lamp 20R is a lamp obtained by integrally assembling a lamp (a right tail lamp) configured to inform a following vehicle of a vehicle traveling in front at nighttime, in bad weather, or the like, and a lamp (a right stop lamp) configured to turn on the lamp on a right rear part when the brake of the automobile 1 is operated.

The right LID lamp 18R includes a right back lamp 22R and a right tail lamp 21R. The right back lamp 22R is a lamp configured to inform a following automobile that the automobile 1 is moving backward by emitting white light when a gear enters a reverse range to move the automobile 1 backward. The right back lamp 22R is configured to include an LED. The right tail lamp 21R is a lamp configured to inform a following vehicle of a vehicle traveling in front at nighttime, in bad weather, or the like. The right tail lamp 21R is configured to include an LED.

The right lighting tool 100R for a vehicle according to the first embodiment includes a right power transmission apparatus and a right power receiving apparatus. The right power transmission apparatus includes the right rear combination lamp 17R, and the right power receiving apparatus includes the right LID lamp 18R. The right lighting tool 100R for a vehicle performs the following processing when either one or both of the right tail lamp 21R and the right back lamp 22R of the right LID lamp 18R provided in the right power receiving apparatus are turned on.

The right lighting tool 100R for a vehicle detects a waveform of electric power supplied from either one or both of the tail lamp power supply TPSL configured to turn on the right tail lamp 21R and the back lamp power supply BPSL configured to turn on the right back lamp 22R in the right power transmission apparatus.

The right lighting tool 100R for a vehicle generates a first control signal to turn on either one or both of the right tail lamp 21R and the right back lamp 22R on the basis of the detected waveform in the right power transmission apparatus. The right lighting tool 100R for a vehicle superimposes the generated first control signal and the electric power supplied from either one or both of the tail lamp power supply TPSL and the back lamp power supply BPSL in the right power transmission apparatus, and wirelessly transmits the signal obtained by the superimposition.

The right lighting tool 100R for a vehicle receives the signal wirelessly transmitted by the right power transmission apparatus in the right power receiving apparatus, converts the received signal, and thus, acquires a second control signal. Here, the second control signal may be the same as or may be different from the first control signal. While the second control signal is the same as the first control signal when the signal transmitted by the right power transmission apparatus is received without problem, the second control signal may be different from the first control signal when there is a problem. The right lighting tool 100R for a vehicle performs control of turning on either one or both of the right tail lamp 21R and the right back lamp 22R according to the acquired second control signal in the right power receiving apparatus.

[Schematic Functional Configuration of Lighting Tool for Vehicle]

Figure 4:
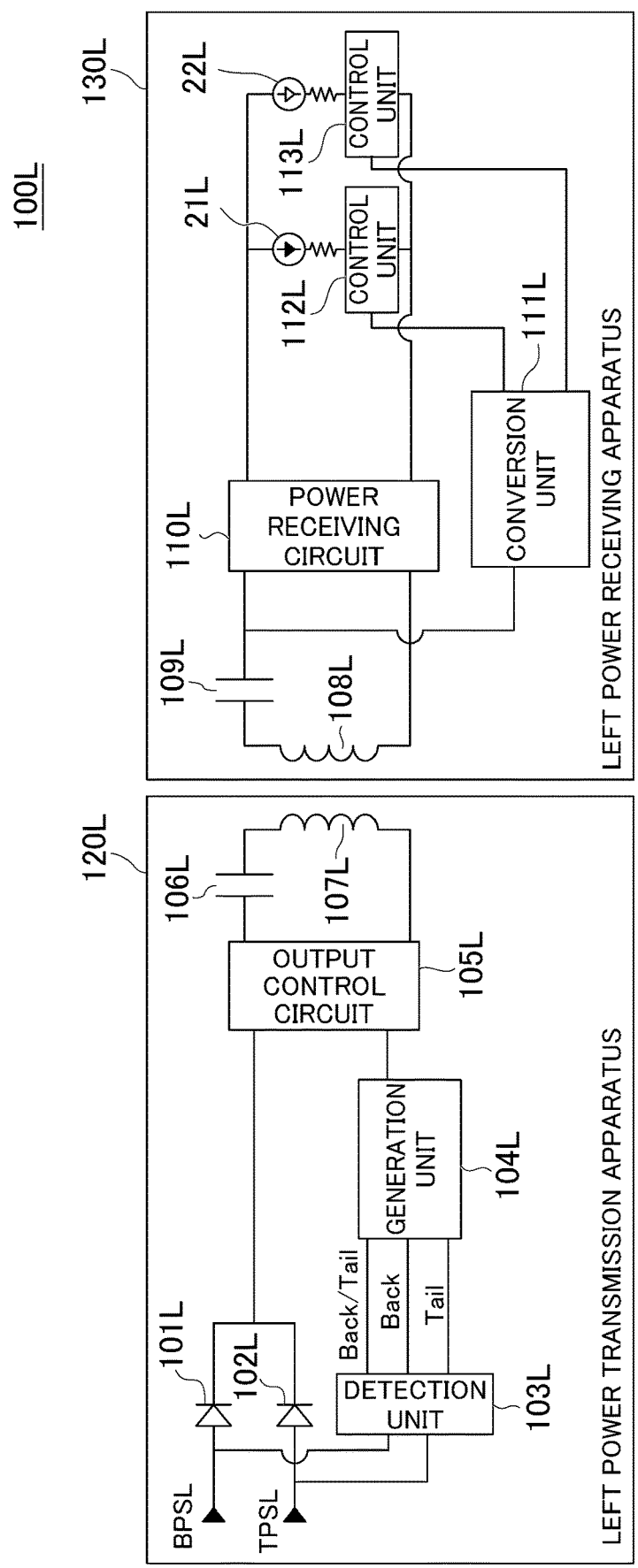
FIG. 4 is a block diagram showing a schematic functional configuration of the lighting tool for a vehicle provided in the automobile according to the first embodiment.

FIG. 4 is a block diagram showing a schematic functional configuration of the lighting tool for a vehicle provided in the automobile 1 according to the first embodiment. FIG. 4 shows the left lighting tool 100L for a vehicle included in the lighting tool for a vehicle of the automobile 1. Here, since the left lighting tool 100L for a vehicle can be applied to the right lighting tool 100R for a vehicle, description thereof will be omitted.

The left lighting tool 100L for a vehicle includes a left power transmission apparatus 120L and a left power receiving apparatus 130L. Hereinafter, the left power transmission apparatus 120L and the left power receiving apparatus 130L will be described in sequence.

(Left Power Transmission Apparatus 120L)

The left power transmission apparatus 120L includes the back lamp power supply BPSL, the tail lamp power supply TPSL, a diode 101L, a diode 102L, a detection unit 103L, a generation unit 104L, an output control circuit 105L, a condenser 106L and a coil 107L.

The back lamp power supply BPSL outputs (supplies) electric power to the detection unit 103L and the output control circuit 105L when an operation of turning on the left back lamp 22L (an operation of putting a gear into reverse to move the automobile 1 backward) is performed with respect to the automobile 1.

The tail lamp power supply TPSL outputs (supplies) electric power to the detection unit 103L and the output control circuit 105L when an operation of turning on the left tail lamp 21L is performed with respect to the automobile 1.

The detection unit 103L is connected to the back lamp power supply BPSL and the tail lamp power supply TPSL. The detection unit 103L detects a waveform of the electric power supplied from either one or both of the back lamp power supply BPSL and the tail lamp power supply TPSL. When the detection unit 103L detects the waveform of the electric power supplied from the back lamp power supply BPSL, the waveform of the electric power supplied from the back lamp power supply BPSL is output to the generation unit 104L. Here, the detected waveform of the electric power supplied from the back lamp power supply BPSL may be the same as or may be different from the waveform of the electric power supplied from the back lamp power supply BPSL output to the generation unit 104L. When the waveforms are different from each other, information in which the waveform of the electric power supplied from the back lamp power supply BPSL and the waveform of the electric power supplied from the back lamp power supply BPSL output to the generation unit 104L, which are detected, are associated with each other is previously stored in the generation unit 104L.

The detection unit 103L outputs the waveform of the electric power supplied from the back lamp power supply BPSL and the tail lamp power supply TPSL to the generation unit 104L when the waveform of the electric power supplied from the back lamp power supply BPSL and the waveform of the electric power supplied from the tail lamp power supply TPSL are detected. Here, information in which the waveform of the electric power supplied from the back lamp power supply BPSL, the waveform of the electric power supplied from the tail lamp power supply TPSL and the waveform of the electric power supplied from the back lamp power supply BPSL and the tail lamp power supply TPSL output to the generation unit 104L, which are detected, are associated with each other is previously stored in the generation unit 104L.

The detection unit 103L outputs the waveform of the electric power supplied from the tail lamp power supply TPSL to the generation unit 104L when the waveform of the electric power supplied from the tail lamp power supply TPSL is detected. Here, the detected waveform of the electric power supplied from the tail lamp power supply TPSL may be the same as or may be different from the waveform of the electric power supplied from the tail lamp power supply TPSL output to the generation unit 104L. When the waveforms are different from each other, information in which the waveform of the electric power supplied from the tail lamp power supply TPSL and the waveform of the electric power supplied from the tail lamp power supply TPSL output to the generation unit 104L, which are detected, are associated with each other is previously stored in the generation unit 104L.

Figure 5A:
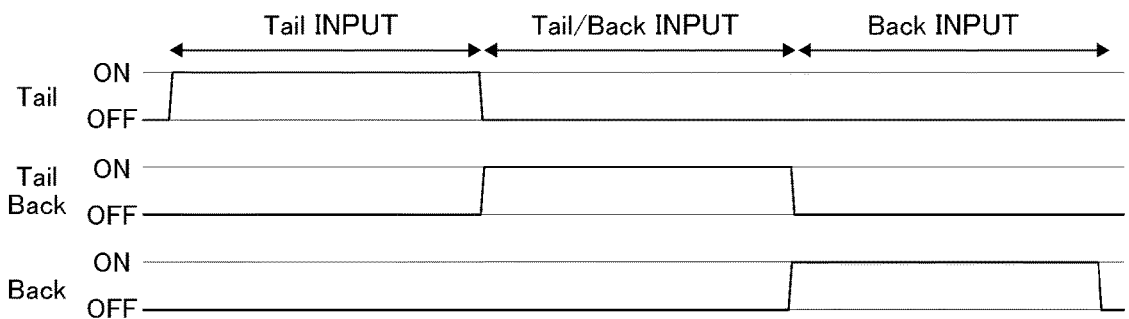
FIG. 5A is a view showing an example of a waveform obtained by a left lighting tool for a vehicle according to the first embodiment.
Figure 5B:
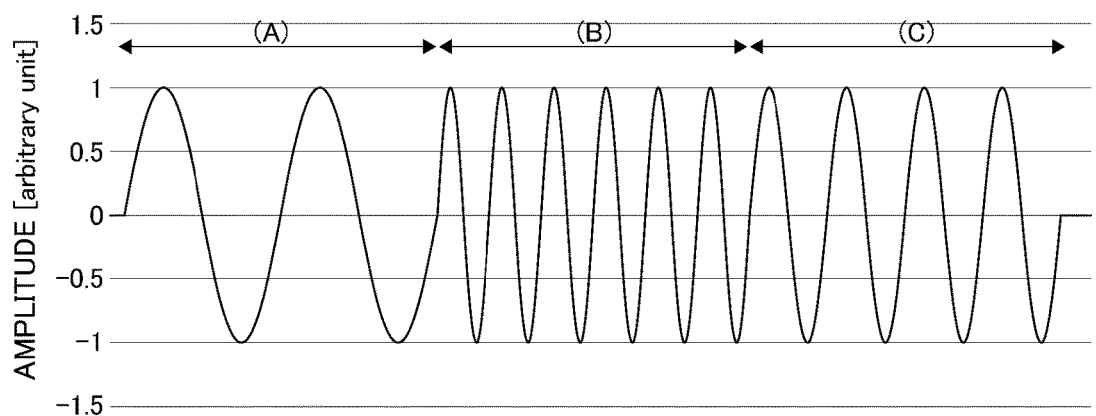
FIG. 5B is a view showing an example of the waveform obtained by the left lighting tool for a vehicle according to the first embodiment.
Figure 5C:
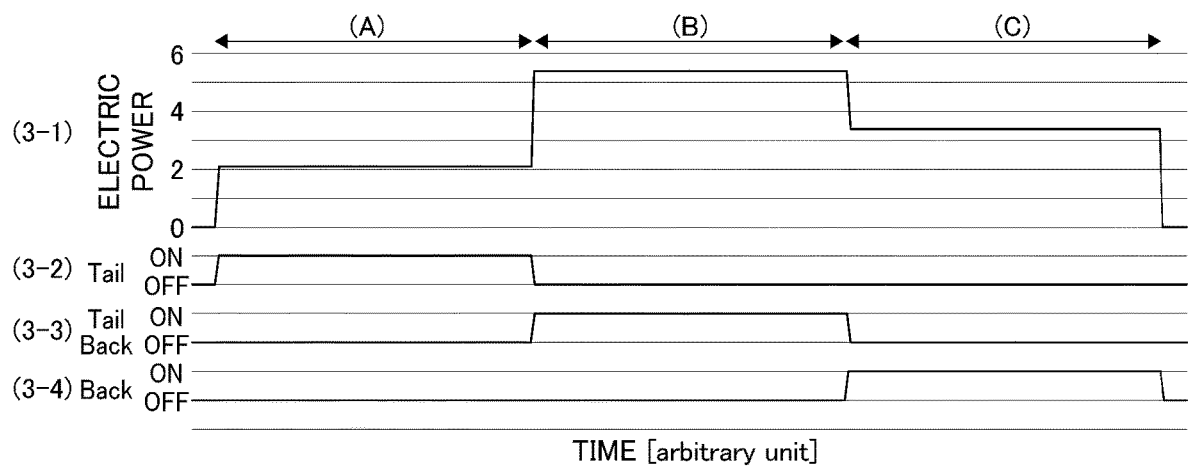
FIG. 5C is a view showing an example of the waveform obtained by the left lighting tool for a vehicle according to the first embodiment.

FIG. 5A to FIG. 5C are views of an example of a waveform obtained by the left lighting tool 100L for a vehicle according to the first embodiment. FIG. 5A is a view showing an example of a waveform output from the detection unit 103L. An upper part in FIG. 5A shows an example of a waveform of electric power output from the detection unit 103L when the tail lamp power supply TPSL supplies electric power. A middle part in FIG. 5A shows an example of a waveform of electric power output from the detection unit 103L when the tail lamp power supply TPSL and the back lamp power supply BPSL supply electric power. A lower part in FIG. 5A shows an example of a waveform of electric power output from the detection unit 103L when the back lamp power supply BPSL supplies electric power.

According to FIG. 5A, each of the waveform of the electric power supplied from the back lamp power supply BPSL, the waveform of the electric power supplied from the tail lamp power supply TPSL and the back lamp power supply BPSL and the waveform of the electric power supplied from the tail lamp power supply TPSL is expressed as a rectangular wave, and electric power supplied in the case of these being in a low state is represented as OFF, and electric power supplied in the case of these being in a high state is represented as ON. The waveform of the electric power supplied from the back lamp power supply BPSL, the waveform of the electric power supplied from the tail lamp power supply TPSL and the back lamp power supply BPSL and the waveform of the electric power supplied from the tail lamp power supply TPSL have different timings in which they are in high state. Description will be continued by returning to FIG. 4.

An example of the generation unit 104L is constituted by a pulse width modulation (PWM) circuit. The generation unit 104L is connected to the detection unit 103L, a first conducting wire through which a waveform of electric power supplied from the back lamp power supply BPSL and the tail lamp power supply TPSL is transmitted, a second conducting wire through which a waveform of electric power supplied from the back lamp power supply BPSL is transmitted, and a third conducting wire through which a waveform of electric power supplied from the tail lamp power supply TPSL is transmitted. The generation unit 104L is synchronized with the detection unit 103L. The generation unit 104L generates a first control signal to turn on either one or both of the left back lamp 22L and the left tail lamp 21L on the basis of any one of the waveform of the electric power supplied from the back lamp power supply BPSL output from the detection unit 103L, the waveform of the electric power supplied from the tail lamp power supply TPSL and the back lamp power supply BPSL and the waveform of the electric power supplied from the tail lamp power supply TPSL. An example of the first control signal is a rectangular wave.

Specifically, the generation unit 104L has a first frequency component in the vicinity of a resonant frequency of the left power transmission apparatus 120L and generates a first control signal to turn on the left back lamp 22L and the left tail lamp 21L when a waveform of electric power supplied from the back lamp power supply BPSL and the tail lamp power supply TPSL output from the detection unit 103L is acquired. In addition, the generation unit 104L has a second frequency component in the vicinity of the resonant frequency of the left power transmission apparatus 120L and generates a first control signal to turn on the left back lamp 22L when a waveform of electric power supplied from the back lamp power supply BPSL output from the detection unit 103L is acquired. In addition, the generation unit 104L has a third frequency component in the vicinity of the resonant frequency of the left power transmission apparatus 120L and generates a first control signal to turn on the left tail lamp 21L when a waveform of electric power supplied from the tail lamp power supply TPSL output from the detection unit 103L is detected. Here, the first frequency, the second frequency and the third frequency will be described.

FIG. 6 is a view showing an example of a relation between a frequency and an output electric power. In the example shown in FIG. 6, a case in which the electric power required for lighting of the lamp is 2 W and a resonant frequency is 300 kHz is shown. According to FIG. 6, the output electric power decreases as the frequency varies from a low frequency side toward a high frequency side. Meanwhile, an electric power loss that is obtained by subtracting the supplied electric power from the electric power required for lighting of the lamp increases as the frequency is varied from the low frequency side toward the high frequency side.

In the first embodiment, an output frequency of the first control signal is selected by selecting a combination of frequencies having a low electric power loss (the first frequency, the second frequency and the third frequency) at a frequency where the output electric power is 2 W or more that is the electric power required for lighting of the lamp. Specifically, for the purpose of identification of the frequency in the left power receiving apparatus, 315 kHz can be selected as an example of the first frequency, 320 kHz can be selected as an example of the second frequency, and 325 kHz can be selected as an example of the third frequency with differences therebetween of 5 kHz. Here, power consumption is increased in the sequence of the case in which the left tail lamp 21L is turned on, the case in which the left back lamp 22L is turned on, and the case in which the left back lamp 22L and the left tail lamp 21L are turned on. For this reason, the output frequency of the first control signal is made to approach the resonant frequency in the sequence of the case in which the left tail lamp 21L is turned on, the case in which the left back lamp 22L is turned on and the case in which the left back lamp 22L and the left tail lamp 21L are turned on. In this way, since current flowing through the left power transmission apparatus can be reduced by making the output frequency of the first control signal to approach the resonant frequency, power consumption can be reduced. Hereinafter, description will be continued in the case in which 315 kHz is selected as an example of the first frequency, 320 kHz is selected as an example of the second frequency and 325 kHz is selected as an example of the third frequency.

In this case, the generation unit 104L generates a first control signal to turn on the left back lamp 22L and the left tail lamp 21L using 315 kHz as the output frequency when a waveform of electric power supplied from the back lamp power supply BPSL and the tail lamp power supply TPSL output from the detection unit 103L is acquired. The generation unit 104L generates a first control signal to turn on the left back lamp 22L using 320 kHz as the output frequency when a waveform of electric power supplied from the back lamp power supply BPSL output from the detection unit 103L is acquired. The generation unit 104L generates a first control signal to turn on the left tail lamp 21L using 325 kHz as the output frequency when a waveform of electric power supplied from the tail lamp power supply TPSL output from the detection unit 103L is obtained. Description will be continued by returning to FIG. 4.

The diode 101L is connected to the back lamp power supply BPSL. The diode 101L outputs the electric power supplied from the back lamp power supply BPSL to the output control circuit 105L.

The diode 102L is connected to the tail lamp power supply TPSL. The diode 102L outputs the electric power supplied from the tail lamp power supply TPSL to the output control circuit 105L.

The output control circuit 105L is connected to the diode 101L, the diode 102L and the generation unit 104L. The output control circuit 105L is synchronized with the generation unit 104L. Any one or both of the electric power supplied from the back lamp power supply BPSL output from the diode 101L and the electric power supplied from the tail lamp power supply TPSL output from the diode 102L are superimposed on the first control signal output from the generation unit 104L.

Specifically, the output control circuit 105L superimposes both of the electric power supplied from the back lamp power supply BPSL output from the diode 101L and the electric power supplied from the tail lamp power supply TPSL output from the diode 102L on the first control signal that turns on the left back lamp 22L and the left tail lamp 21L using 315 kHz as the output frequency. In addition, the output control circuit 105L superimposes the electric power supplied from the back lamp power supply BPSL output from the diode 101L on the first control signal that turns on the left back lamp 22L using 320 kHz as the output frequency. In addition, the output control circuit 105L superimposes the electric power supplied from the tail lamp power supply TPSL output from the diode 102L on the first control signal that turns on the left tail lamp 21L using 325 kHz as the output frequency.

The output control circuit 105L supplies the signal obtained through superimposition to a series resonance circuit (a power transmission section) including the condenser 106L and the coil 107L.

The series resonance circuit (the power transmission section) is connected to the output control circuit 105L. The series resonance circuit (the power transmission section) transmits the signal supplied from the output control circuit 105L.

FIG. 5B is a view showing an example of a waveform output from the output control circuit 105L. In FIG. 5B, part (A) is a first control signal that turns on the left tail lamp 21L.

An output frequency of the first control signal shown in part (A) in FIG. 5B is 325 kHz. Part (B) in FIG. 5B is a first control signal that turns on the left back lamp 22L and the left tail lamp 21L. An output frequency of the first control signal shown in part (B) in FIG. 5B is 315 kHz. Part (C) in FIG. 5B is a first control signal that turns on the left back lamp 22L. An output frequency of the first control signal shown in part (C) in FIG. 5B is 320 kHz.

According to FIG. 5B, the first control signal shown in part (A) in FIG. 5B, the first control signal shown in part (B) in FIG. 5B and the first control signal shown in part (C) in FIG. 5B are represented as sine waves and have different frequencies.

Returning to FIG. 4, description will be continued.

A resonant frequency f0 of the series resonance circuit is expressed as Equation (1) when a static capacitance of the condenser 106L is represented as L and an inductance of the coil 107L is represented as C.

$$f0 = 1/2\pi\sqrt{(LC)} \quad (1)$$

Here, description in the case in which the resonant frequency f0 is 300 kHz will be continued.

Since the impedance is extremely low because the signal obtained by superimposing the electric power supplied from the back lamp power supply BPSL and the tail lamp power supply TPSL on the first control signal using 315 kHz output from the generation unit 104L as the output frequency has a frequency component close to the resonant frequency, a large current can flow through the coil 107L. Accordingly, the series resonance circuit can generate a large magnetic flux even when an amplitude of electric power supplied from the back lamp power supply BPSL and the tail lamp power supply TPSL is not large. In this case, the transmitted electric power is 5.4 W.

In addition, since the impedance is extremely low because the signal obtained by superimposing the electric power supplied from the back lamp power supply BPSL on the first control signal using 320 kHz output from the generation unit 104L as the output frequency has a frequency component close to the resonant frequency, a large current can flow through the coil 107L. Accordingly, the series resonance circuit can generate a large magnetic flux even when an amplitude of electric power supplied from the back lamp power supply BPSL and the tail lamp power supply TPSL is not large. In this case, the transmitted electric power is 3.4 W.

In addition, since the impedance is extremely low because the signal obtained by superimposing the electric power supplied from the tail lamp power supply TPSL and the first control signal using 325 kHz output from the generation unit 104L as the output frequency has a frequency component close to the resonant frequency, a large current can flow through the coil 107L. Accordingly, the series resonance circuit can generate a large magnetic flux even when an amplitude of electric power supplied from the back lamp power supply BPSL and the tail lamp power supply TPSL is not large. In this case, the transmitted electric power is 2.1 W.

(Left Power Receiving Apparatus 130L)

The left power receiving apparatus 130L includes a coil 108L, a condenser 109L, a power receiving circuit 110L, a conversion unit 111L, a control unit 112L, a control unit 113L, the left tail lamp 21L and the left back lamp 22L.

The series resonance circuit (the power receiving section) including the condenser 109L and the coil 108L receives a signal transmitted by the left power transmission apparatus 120L. The series resonance circuit (the power receiving section) outputs the received signal to the power receiving circuit 110L and the conversion unit 111L. The series resonance circuit (the power transmission section) and the series resonance circuit (the power receiving section) are disposed to face each other and electrically connected to each other through a wireless manner.

The power receiving circuit 110L is connected to the series resonance circuit (the power receiving section). The power receiving circuit 110L is constituted by a smoothing circuit or the like. The power receiving circuit 110L converts the signal (a high frequency voltage) output from the series resonance circuit (the power receiving section) into direct current, and supplies the direct current to a lamp for a vehicle such as the left tail lamp 21L, the left back lamp 22L, or the like.

The conversion unit 111L is connected to the series resonance circuit (the power receiving section). The conversion unit 111L is configured to include an FV conversion circuit (a frequency/voltage converter) and an A/D conversion circuit. The conversion unit 111L converts the signal (the high frequency voltage) output from the series resonance circuit (the power receiving section) into a direct current voltage in proportion to a frequency of a pulse, and converts the signal obtained by conversion to the direct current voltage into a digital signal. The conversion unit 111L determines whether any one of the first control signal that turns on the left back lamp 22L and the left tail lamp 21L, the first control signal that turns on the left back lamp 22L and the first control signal that turns on the left tail lamp 21L is included in the signal transmitted from the left power transmission apparatus 120L on the basis of the signal obtained by conversion to the digital signal.

Specifically, the conversion unit 111L determines that the output frequency of the first control signal is 315 kHz when the amplitude of the signal obtained by conversion to the digital signal is a first amplitude. Since the first control signal having the output frequency of 315 kHz is the first control signal that turns on the left back lamp 22L and the left tail lamp 21L, the conversion unit 111L generates a second control signal instructing to turn ON the left tail lamp 21L and the left back lamp 22L, and outputs the generated second control signal to the control unit 112L and the control unit 113L.

In addition, the conversion unit 111L determines that the output frequency of the first control signal is 320 kHz when the amplitude of the signal obtained by conversion to the digital signal is a second amplitude.

Since the first control signal having the output frequency of 320 kHz is the first control signal that turns on the left back lamp 22L, the conversion unit 111L generates a second control signal instructing to turn ON the left back lamp 22L, and outputs the generated second control signal to the control unit 113L.

In addition, the conversion unit 111L determines that the output frequency of the first control signal is 325 kHz when the amplitude of the signal obtained by conversion to the digital signal is a third amplitude.

Since the first control signal having the output frequency of 325 kHz is the first control signal that turns on the left tail lamp 21L, the conversion unit 111L generates a second control signal instructing to turn ON the left tail lamp 21L, and outputs the generated second control signal to the control unit 112L.

FIG. 5C is a view showing examples of a waveform obtained by the conversion unit 111L and a waveform that is output. In FIG. 5C, part (3-1) shows a signal obtained by converting the signal (the high frequency voltage) output from the series resonance circuit (the power receiving section) into a direct current voltage in proportion to a frequency of a pulse and converting the signal obtained through conversion to the direct current voltage into a digital signal. In the signal shown in part (3-1) in FIG. 5C, since part (A) in FIG. 5C has the third amplitude, part (A) in FIG. 5C is the signal that turns on the left tail lamp 21L. The third amplitude of the signal shown in part (A) in FIG. 5C is 2 V. Since part (B) in FIG. 5C has the first amplitude, part (B) in FIG. 5C is a signal that turns on the left back lamp 22L and the left tail lamp 21L. The first amplitude of the signal shown in part (B) in FIG. 5C is 5.5 V. Since part (C) in FIG. 5C has the second amplitude, part (C) in FIG. 5C is a signal that turns on the left back lamp 22L. The second amplitude of the signal shown in part (C) in FIG. 5C is 3.5 V.

According to part (3-1) in FIG. 5C, when the signal that turns on the left tail lamp 21L, the signal that turns on the left back lamp 22L and the left tail lamp 21L and the signal that turns on the left back lamp 22L have different amplitudes of about 1.5 V to 2 V, the first control signal can be recognized.

In the related art, when the signal on which the electric power is superimposed is converted, a voltage of the signal needs to be varied to a lower degree than the transmission voltage. For this reason, a detection level width is narrowed, and there is greater susceptibility to effects of external fluctuation or external noise such as positional deviation between coils. In the first embodiment, since the detection level width can be made similar to the transmission voltage, it can be less susceptible to external fluctuation or external noise.

In FIG. 5C, parts (3-2), (3-3) and (3-4) show examples of the second control signal. The conversion unit 111L generates a second control signal that turns on the left tail lamp 21L shown in part (3-2) in FIG. 5C when the signal that turns on the left tail lamp 21L shown in part (A) of (3-1) in FIG. 5C is acquired by converting the signal (the high frequency voltage) output from the series resonance circuit (the power receiving section) into a direct current voltage in proportion to a frequency of a pulse and converting the signal obtained by conversion to the direct current voltage into a digital signal.

In addition, the conversion unit 111L generates a second control signal that turns on the left back lamp 22L and the left tail lamp 21L shown in part (3-3) in FIG. 5C when the signal that turns on the left back lamp 22L and the left tail lamp 21L shown in part (B) of (3-1) in FIG. 5C is acquired by converting the signal (the high frequency voltage) output from the series resonance circuit (the power receiving section) into a direct current voltage in proportion to a frequency of a pulse and converting the signal obtained by conversion to the direct current voltage into a digital signal.

In addition, the conversion unit 111L generates a second control signal that turns on the left back lamp 22L shown in part (3-4) in FIG. 5C when the signal that turns on the left back lamp 22L shown in part (C) of (3-1) in FIG. 5C is acquired by converting the signal (the high frequency voltage) output from the series resonance circuit (the power receiving section) into a direct current voltage in proportion to a frequency of a pulse and converting the signal obtained by conversion to the direct current voltage into a digital signal.

According to parts (3-2), (3-3) and (3-4) in FIG. 5C, the waveform of the second control signal that turns on the left tail lamp 21L, the waveform of the second control signal that turns on the left back lamp 22L and the left tail lamp 21L and the waveform of the second control signal that turns on the left back lamp 22L are expressed as rectangular waves, the left tail lamp 21L and the left back lamp 22L are turned OFF in the case of these being in a low state, and either one or both of the left tail lamp 21L and the left back lamp 22L are turned ON in the case of these being in a high state.

The waveform of the second control signal that turns on the left tail lamp 21L, the waveform of the second control signal that turns on the left back lamp 22L and the left tail lamp 21L and the waveform of the second control signal that turns on the left back lamp 22L have different timings in which they are in high state. Description returning to FIG. 4 will be described below.

The control unit 112L is connected to the conversion unit 111L, the left tail lamp 21L and the power receiving circuit 110L. The control unit 112L is synchronized with the conversion unit 111L. The control unit 112L controls the left tail lamp 21L according to the second control signal output from the conversion unit 111L. Specifically, the control unit 112L turns on the left tail lamp 21L by applying a voltage output from the power receiving circuit 110L to the left tail lamp 21L when the second control signal is ON, and turns off the left tail lamp 21L when the second control signal is OFF.

The control unit 113L is connected to the conversion unit 111L, the left back lamp 22L and the power receiving circuit 110L. The control unit 113L is synchronized with the conversion unit 111L. The control unit 112L controls the left back lamp 22L according to the second control signal output from the conversion unit 111L. Specifically, the control unit 113L turns on the left back lamp 22L by applying a voltage output from the power receiving circuit 110L to the left back lamp 22L when the second control signal indicates ON and turns off the left back lamp 22L when the second control signal indicates OFF.

The left tail lamp 21L is connected to the power receiving circuit 110L and the control unit 112L. The left tail lamp 21L is turned on or off under control of the control unit 112L.

The left back lamp 22L is connected to the power receiving circuit 110L and the control unit 113L. The left back lamp 22L is turned on or off under control of the control unit 113L.

[Operation of Lighting Tool for a Vehicle]

Figure 7:
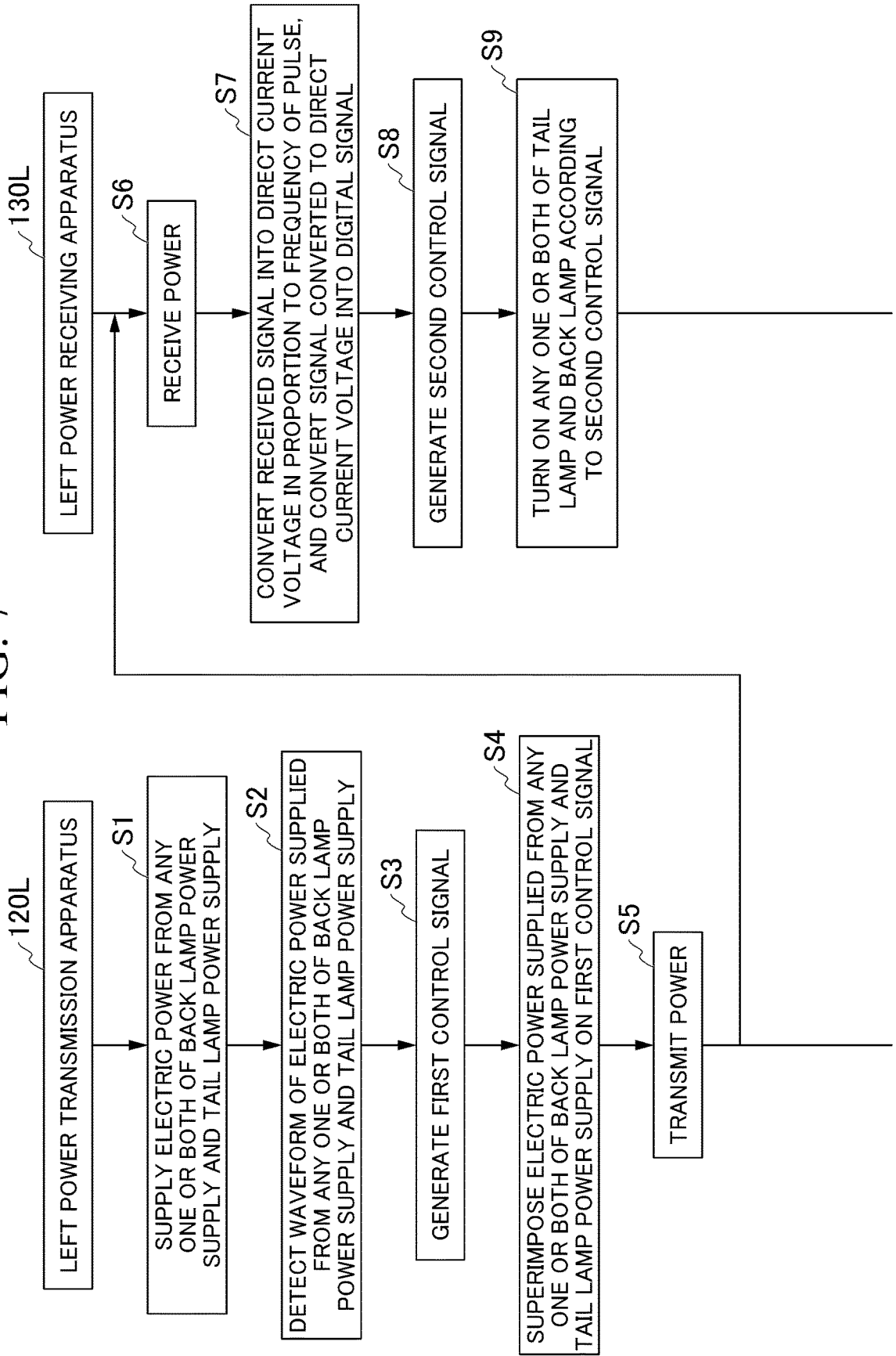
FIG. 7 is a sequence chart showing an example of an operation of the lighting tool for a vehicle according to the first embodiment.

FIG. 7 is a sequence chart showing an example of an operation of the lighting tool for a vehicle according to the first embodiment. In the sequence chart shown in FIG. 7, a case in which a driver in the automobile 1 performs either one or both of an operation of turning on the left back lamp 22L and an operation of turning on the left tail lamp 21L with respect to the automobile 1 will be described.

(Step S1)

Any one or both of the back lamp power supply BPSL and the tail lamp power supply TPSL of the left power transmission apparatus 120L supply electric power to the output control circuit 105L and the detection unit 103L.

When the operation of turning on the left tail lamp 21L is performed with respect to the automobile 1, the tail lamp power supply TPSL supplies the electric power to the output control circuit 105L and the detection unit 103L.

When the operation of turning on the left back lamp 22L is performed with respect to the automobile 1, the back lamp power supply BPSL supplies the electric power to the output control circuit 105L and the detection unit 103L.

When the operation of turning on the left tail lamp 21L and the operation of turning on the left back lamp 22L are performed with respect to the automobile 1, the tail lamp power supply TPSL supplies the electric power to the output control circuit 105L and the detection unit 103L, and the back lamp power supply BPSL supplies the electric power to the output control circuit 105L and the detection unit 103L.

(Step S2)

The detection unit 103L of the left power transmission apparatus 120L detects a waveform of electric power supplied from either one or both of the back lamp power supply BPSL and the tail lamp power supply TPSL. The detection unit 103L outputs any one of the waveform of the electric power supplied from the back lamp power supply BPSL, the waveform of the electric power supplied from the tail lamp power supply TPSL and the waveform of the electric power supplied from the tail lamp power supply TPSL and the back lamp power supply BPSL to the generation unit 104L according to the detected waveform.

(Step S3)

The generation unit 104L of the left power transmission apparatus 120L generates any one of the first control signal having a second frequency component and turning on the left back lamp 22L, the first control signal having a first frequency component and turning on the left back lamp 22L and the left tail lamp 21L and the first control signal having a third frequency component and turning on the left tail lamp 21L on the basis of any one of the waveform of the electric power supplied from the back lamp power supply BPSL output from the detection unit 103L, the waveform of the electric power supplied from the tail lamp power supply TPSL and the back lamp power supply BPSL and the waveform of the electric power supplied from the tail lamp power supply TPSL.

(Step S4)

Any one or both of the electric power supplied from the back lamp power supply BPSL of the left power transmission apparatus 120L and the electric power supplied from the tail lamp power supply TPSL are superimposed on the first control signal output from the generation unit 104L.

(Step S5)

The output control circuit 105L of the left power transmission apparatus 120L supplies the signal obtained by superimposition to the series resonance circuit (the power transmission section) including the condenser 106L and the coil 107L. The series resonance circuit (the power transmission section) transmits the signal supplied from the output control circuit 105L.

(Step S6)

The series resonance circuit (the power receiving section) including the condenser 109L and the coil 108L of the left power receiving apparatus 130L receives the signal transmitted from the left power transmission apparatus 120L.

(Step S7)

The conversion unit 111L of the left power receiving apparatus 130L converts the signal (the high frequency voltage) output from the series resonance circuit (the power receiving section) into a direct current voltage in proportion to a frequency of a pulse, and converts the signal obtained by conversion to the direct current voltage into a digital signal.

(Step S8)

The conversion unit 111L of the left power receiving apparatus 130L determines that the output frequency of the first control signal is 315 kHz when the amplitude of the signal obtained by conversion to the digital signal is a first amplitude. In this case, the conversion unit 111L generates a second control signal instructing to turn ON the left tail lamp 21L and the left back lamp 22L. In addition, the conversion unit 111L determines that the output frequency of the first control signal is 320 kHz when the amplitude of the signal obtained by conversion to the digital signal is a second amplitude. In this case, the conversion unit 111L generates a second control signal instructing to turn ON the left back lamp 22L. In addition, the conversion unit 111L determines that the output frequency of the first control signal is 325 kHz when the amplitude of the signal obtained by conversion to the digital signal is a third amplitude. In this case, the conversion unit 111L generates a second control signal instructing to turn ON the left tail lamp 21L.

(Step S9)

The conversion unit 111L of the left power receiving apparatus 130L outputs the second control signal to either one or both of the control unit 112L and the control unit 113L.

The control unit 112L controls the left tail lamp 21L according to the second control signal output from the conversion unit 111L. Specifically, the control unit 112L turns on the left tail lamp 21L when the second control signal indicates ON, and turns off the left tail lamp 21L when the second control signal indicates OFF.

The control unit 113L controls the left back lamp 22L according to the second control signal output from the conversion unit 111L. Specifically, the control unit 113L turns on the left back lamp 22L when the second control signal indicates ON, and turns off the left back lamp 22L when the second control signal indicates OFF.

In the above-mentioned first embodiment, while the case in which the conversion unit 111L of the left power receiving apparatus 130L includes the FV conversion circuit and the A/D conversion circuit has been described, there is no limitation thereto.

For example, the conversion unit 111L may be configured to include an integrated circuit (IC) capable of extracting a specified frequency of a tone decoder or the like. In this case, the conversion unit 111L generates second control information according to the extracted frequency.

In the above-mentioned first embodiment, while the case in which the signals obtained by converting the signal (the high frequency voltage) output from the series resonance circuit (the power receiving section) into the direct current voltage in proportion to the frequency of the pulse and converting the signal obtained by conversion to the direct current voltage into a digital signal are different by about 1.5 V to 2 V according to the frequency has been described, there is no limitation thereto. For example, the voltage may be smaller than 1.5 V or may be larger than 2 V as long as the voltage can be recognized by the conversion unit 111L.

In the above-mentioned first embodiment, while the case in which lighting of either one or both of the left tail lamp 21L and the left back lamp 22L is controlled has been described, there is no limitation thereto. The types of lamps for which lighting is controlled is not limited to these two types and may be one type or may be three types or more.

In the above-mentioned first embodiment, while the case in which the left lighting tool 100L for a vehicle and the right lighting tool 100R for a vehicle include the tail lamp power supply TPSL and the back lamp power supply BPSL has been described, there is no limitation thereto. For example, the tail lamp power supply TPSL and the back lamp power supply BPSL may be shared by the left lighting tool 100L for a vehicle and the right lighting tool 100R for a vehicle.

In the above-mentioned first embodiment, while the case in which the left power transmission apparatus 120L includes the left rear combination lamp 17L, the left power receiving apparatus 130L includes the left LID lamp 18L, and either one or both of the left tail lamp 21L and the left back lamp 22L of the left LID lamp 18L included in the left power receiving apparatus 130L are turned on has been described, there is no limitation thereto. For example, a configuration in which the left power transmission apparatus 120L includes the left LID lamp 18L, the left power receiving apparatus 130L includes the left rear combination lamp 17L, and either one or both of the left turn light 19L and the left tail/stop lamp 20L of the left rear combination lamp 17L included in the left power receiving apparatus 130L are turned on may be provided. A right power transmission apparatus 120R and a right power receiving apparatus 130aR are also similar thereto.

In the above-mentioned first embodiment, while the case in which either one or both of the left turn light 19L and the left tail/stop lamp 20L included in the left rear combination lamp 17L are turned on in the left taillight section 11L and the case in which either one or both of the right turn light 19R and the right tail/stop lamp 20R included in the right rear combination lamp 17R are turned on in the right taillight section 11R have been described, there is no limitation thereto. For example, the embodiment is not limited to taillights, and may also be applied to a case in which lighting of a plurality of lamps is switched between in the left headlight section 10L and the right headlight section 10R.

According to the lighting tool for a vehicle of the first embodiment, when an operation of turning on either one or both of the left tail lamp 21L and the left back lamp 22L is performed, the left power transmission apparatus 120L superimposes either one or both of the electric power supplied from the back lamp power supply BPSL and the electric power supplied from the tail lamp power supply TPSL on the first control signal generated according to the operation and having different output frequency components and transmits the signal obtained by superimposition to the left power receiving apparatus 130L. According to the above-mentioned configuration, the left power transmission apparatus 120L can transmit the first control signal with a simple configuration without additional parts required when infrared communication or Bluetooth is used being provided. In addition, when a signal is transmitted from the power transmission side to the power receiving side through wireless power supply, the waveform obtained on the power receiving side coil does not appear tidy. In addition, a voltage value is not constant since the distance between the coils varies due to mass production variation. For this reason, when the electric power line carrier communication is used, there is a problem in operation stability on an output side. In addition, when the electric power line carrier communication is used, an influence of external noise is increased. The left power transmission apparatus 120L can reduce electric power loss because the first control signal is less susceptible to external fluctuation or external noise such as a positional deviation between the coils or the like.

The left power receiving apparatus 130L receives the signal transmitted from the left power transmission apparatus 120L, converts the received signal into a direct current voltage in proportion to the frequency of the pulse, and converts the signal obtained by conversion to the direct current voltage into a digital signal. The left power receiving apparatus 130L generates a second control signal on the basis of the digital signal, and turns on either one or both of the left tail lamp 21L and the left back lamp 22L on the basis of the generated second control signal. According to the above-mentioned configuration, the left power receiving apparatus 130L can select a frequency and generates a second control signal from the selected frequency on the basis of the digital signal obtained from the received signal.

Configuration Example

As a configuration example, in the lighting tool for a vehicle (in the embodiment, the left lighting tool 100L for a vehicle, the right lighting tool 100R for a vehicle) including the first power supply (in the embodiment, the back lamp power supply BPSL, the tail lamp power supply TPSL) mounted on the vehicle (in the embodiment, the automobile 1) and the lamp for a vehicle (the left back lamp 22L, the left tail lamp 21L) attached to the vehicle and operated with electric power supplied from the first power supply, the lighting tool for a vehicle includes the lamp for a vehicle, a detection unit configured to detect a waveform of first electric power supplied from the first power supply, a generation unit configured to generate a first control signal that is a signal of controlling the lamp for a vehicle according to the waveform of the first electric power detected by the detection unit, an output control unit (in the embodiment, the output control circuit 105L) configured to superimpose the first control signal generated by the generation unit on the first electric power supplied from the first power supply and wirelessly transmit the signal obtained by the superimposition from a power transmission section (in the embodiment, the series resonance circuit including the condenser 106L and the coil 107L), a conversion unit provided on the lamp for a vehicle and configured to acquire a second control signal based on the signal received by a power receiving section (in the embodiment, the series resonance circuit including the condenser 109L and the coil 108L) configured to receive the signal wirelessly transmitted from the power transmission section, and a lamp control unit (in the embodiment, the control unit 112L, the control unit 113L) configured to control the lamp for a vehicle according to the second control signal acquired by the conversion unit.

As a configuration example, the second power supply (in the embodiment, the back lamp power supply BPSL, the tail lamp power supply TPSL) is provided, the detection unit detects either one or both of the waveform of the first electric power supplied from the first power supply and the waveform of the second electric power supplied from the second power supply, the generation unit generates a first control signal according to either one or both of the waveform of the first electric power and the waveform of the second electric power detected by the detection unit, and the output control unit superimposes the first control signal generated by the generation unit on either one or both of the first electric power and the second electric power.

As a configuration example, the output control unit generates a first control signal having different frequency components according to either one or both of the waveform of the first electric power and the waveform of the second electric power detected by the detection unit.

As a configuration example, the output control unit generates first control information having a frequency component determined according to power consumption of the lamp for a vehicle.

Second Embodiment

A lighting tool for a vehicle of a second embodiment is distinguished from the lighting tool for a vehicle according to the first embodiment in that the lighting tool for a vehicle generates a first control signal having different amplitudes when the first control signal that instructs turning on either one or both of the left back lamp 22L and the left tail lamp 21L is generated on the basis of any one of the waveform of the electric power supplied from the tail lamp power supply TPSL and the back lamp power supply BPSL, the waveform of the electric power supplied from the tail lamp power supply TPSL and the waveform of the electric power supplied from the back lamp power supply BPSL.

The lighting tool for a vehicle according to the second embodiment is mounted on the vehicle. In the second embodiment, an automobile is exemplarily shown as the vehicle, the vehicle may be a motorcycle, bicycle, a microminiature mobility, a personal mobility, or the like.

[Schematic Configuration of Automobile 1]

FIG. 1 can be applied as a schematic configuration of an automobile 1a according to the second embodiment.

The automobile 1a includes the left headlight section 10L, the right headlight section 10R, the left taillight section 11L, the right taillight section 11R, the left side mirror 13L, the right side mirror 13R, the front window 15 and the rear window 16.

In addition, the automobile 1a includes a lighting tool for a vehicle. The lighting tool for a vehicle includes a left lighting tool 100aL for a vehicle and a right lighting tool 100aR for a vehicle. The left lighting tool 100aL for a vehicle is disposed on a left side of a rear side of the automobile 1a, and the right lighting tool 100aR for a vehicle is provided on a right side of the rear side of the automobile 1a.

Here, in the second embodiment, while a part of a configuration of the automobile 1a is shown, for example, in addition to this, the automobile 1a may include arbitrary configuration parts such as other configuration parts generally included in a general automobile.

In addition, each of the left lighting tool 100aL for a vehicle and the right lighting tool 100aR for a vehicle includes a lamp for a vehicle and an illumination system. The illumination system may be included in the automobile 1 without being seen in an appearance of the automobile 1a.

FIG. 2 can be applied as a drawing showing a rear portion of the automobile 1a on which the lighting tool for a vehicle according to the second embodiment is mounted.

FIG. 3 can be applied as a drawing showing an example of a taillight of the automobile 1a according to the second embodiment.

The left lighting tool 100aL for a vehicle according to the second embodiment includes a left power transmission apparatus and a left power receiving apparatus. The left power transmission apparatus includes a left rear combination lamp 17aL, and the left power receiving apparatus includes a left LID lamp 18aL. The left lighting tool 100aL for a vehicle performs the following processing when either one or both of the left tail lamp 21L and the left back lamp 22L included in the left power receiving apparatus are turned on.

The left lighting tool 100aL for a vehicle detects a waveform of electric power supplied from either one or both of the tail lamp power supply TPSL configured to turn on the left tail lamp 21L and the back lamp power supply BPSL configured to turn on the left back lamp 22L in the left power transmission apparatus.

The left lighting tool 100L for a vehicle generates a first control signal that turns on either one or both of the left tail lamp 21L and the left back lamp 22L on the basis of the detected waveform in the left power transmission apparatus. The left lighting tool 100L for a vehicle superimposes the generated first control signal on the electric power supplied from either one or both of the tail lamp power supply TPSL and the back lamp power supply BPSL and wirelessly transmits the signal obtained by superimposition in the left power transmission apparatus.

The left lighting tool 100aL for a vehicle acquires a second control signal by receiving the signal wirelessly transmitted from the left power transmission apparatus and converting the received signal in the left power receiving apparatus. Here, the second control signal may be the same as or may be different from the first control signal. While the second control signal is the same as the first control signal when the signal transmitted from the left power transmission apparatus is received with no problem, the signals may be different from each other when there is a problem. The left lighting tool 100aL for a vehicle performs control of turning on either one or both of the left tail lamp 21L and the left back lamp 22L according to the acquired second control signal in the left power receiving apparatus.

The right lighting tool 100aR for a vehicle according to the second embodiment includes a right power transmission apparatus and a right power receiving apparatus. The right power transmission apparatus includes a right rear combination lamp 17R, and the right power receiving apparatus includes a right LID lamp 18R. The right lighting tool 100aR for a vehicle performs the following processing when either one or both of the right tail lamp 21R and the right back lamp 22R of the right LID lamp 18R included in the right power receiving apparatus are turned on.

The right lighting tool 100aR for a vehicle detects a waveform of electric power supplied from either one or both of the tail lamp power supply TPSL configured to turn on the right tail lamp 21R and the back lamp power supply BPSL configured to turn on the right back lamp 22R in the right power transmission apparatus. The right lighting tool 100aR for a vehicle generates a first control signal that turns on either one or both of the right tail lamp 21R and the right back lamp 22R on the basis of the detected waveform in the right power transmission apparatus. The right lighting tool 100aR for a vehicle superimposes the generated first control signal on the electric power supplied from either one or both of the tail lamp power supply TPSL and the back lamp power supply BPSL and wirelessly transmits the signal obtained by superimposition in the right power transmission apparatus.

The right lighting tool 100aR for a vehicle acquires a second control signal by receiving the signal wirelessly transmitted from the right power transmission apparatus and converting the received signal in the right power receiving apparatus. Here, the second control signal may be the same as or may be different from the first control signal. While the second control signal is the same as the first control signal when the signal transmitted from the right power transmission apparatus is received with no problem, the signals may be different from each other when there is a problem. The right lighting tool 100aR for a vehicle performs control of turning on either one or both of the right tail lamp 21R and the right back lamp 22R according to the acquired second control signal in the right power receiving apparatus.

[Schematic Functional Configuration of Lighting Tool for a Vehicle]

Figure 8:
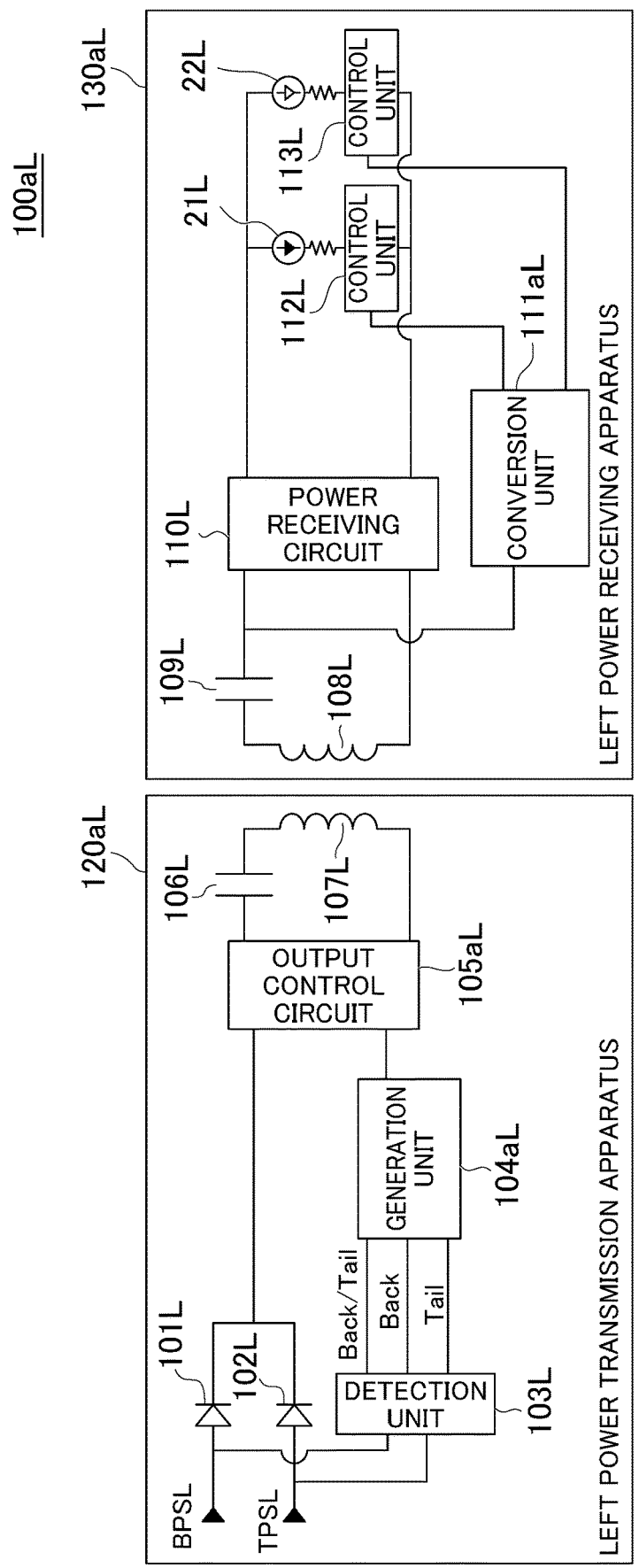
FIG. 8 is a block diagram showing a schematic functional configuration of a lighting tool for a vehicle provided in an automobile according to a second embodiment.

FIG. 8 is a block diagram showing a schematic functional configuration of the lighting tool for a vehicle included in the automobile 1a according to the second embodiment. FIG. 8 shows the left lighting tool 100aL for a vehicle included in the lighting tool for a vehicle of the automobile 1a. Here, since the left lighting tool 100aL for a vehicle can be applied as the right lighting tool 100aR for a vehicle, description thereof will be omitted.

The left lighting tool 100aL for a vehicle includes a left power transmission apparatus 120aL and a left power receiving apparatus 130aL. Hereinafter, the left power transmission apparatus 120aL and the left power receiving apparatus 130aL will be described in sequence.

(Left Power Transmission Apparatus 120aL)

The left power transmission apparatus 120aL includes the back lamp power supply BPSL, the tail lamp power supply TPSL, the diode 101L, the diode 102L, the detection unit 103L, a generation unit 104aL, an output control circuit 105aL, the condenser 106L and the coil 107L.

The back lamp power supply BPSL outputs (supplies) the electric power to the detection unit 103L and the output control circuit 105aL when an operation of turning on the left back lamp 22L (an operation of shifting a gear to a reverse range to move the automobile 1 backward) is performed with respect to the automobile 1a.

The tail lamp power supply TPSL outputs (supplies) the electric power to the detection unit 103L and the output control circuit 105aL when an operation of turning on the left tail lamp 21L is performed with respect to the automobile 1a.

The detection unit 103L is connected to the back lamp power supply BPSL and the tail lamp power supply TPSL. The detection unit 103L detects a waveform of electric power supplied from either one or both of the back lamp power supply BPSL and the tail lamp power supply TPSL. The detection unit 103L outputs the waveform of the electric power supplied from the back lamp power supply BPSL to the generation unit 104aL when the waveform of the electric power supplied from the back lamp power supply BPSL is detected. Here, the detected waveform of the electric power supplied from the back lamp power supply BPSL may be the same as or may be different from the waveform of the electric power supplied from the back lamp power supply BPSL output to the generation unit 104aL. When the signals are different from each other, information in which the waveform of the electric power supplied from the back lamp power supply BPSL and the waveform of the electric power supplied from the back lamp power supply BPSL output to the generation unit 104aL, which are detected, are associated with each other is previously stored in the generation unit 104aL.

The detection unit 103L outputs the waveform of the electric power supplied from the back lamp power supply BPSL and the tail lamp power supply TPSL to the generation unit 104aL when the waveform of the electric power supplied from the back lamp power supply BPSL and the waveform of the electric power supplied from the tail lamp power supply TPSL are detected. Here, information in which the waveform of the electric power supplied from the back lamp power supply BPSL, the waveform of the electric power supplied from the tail lamp power supply TPSL and the waveform of the electric power supplied from the back lamp power supply BPSL and the tail lamp power supply TPSL output to the generation unit 104aL, which are detected, are associated with each other is previously stored in the generation unit 104aL.

The detection unit 103L outputs the waveform of the electric power supplied from the tail lamp power supply TPSL to the generation unit 104aL when the waveform of the electric power supplied from the tail lamp power supply TPSL is detected. Here, the detected waveform of the electric power supplied from the tail lamp power supply TPSL may be the same as or may be different from the waveform of the electric power supplied from the tail lamp power supply TPSL output to the generation unit 104aL. When the waveforms are different from each other, information in which the waveform of the electric power supplied from the tail lamp power supply TPSL and the waveform of the electric power supplied from the tail lamp power supply TPSL output to the generation unit 104aL, which are detected, are associated with each other is previously stored in the generation unit 104aL.

Figure 9A:
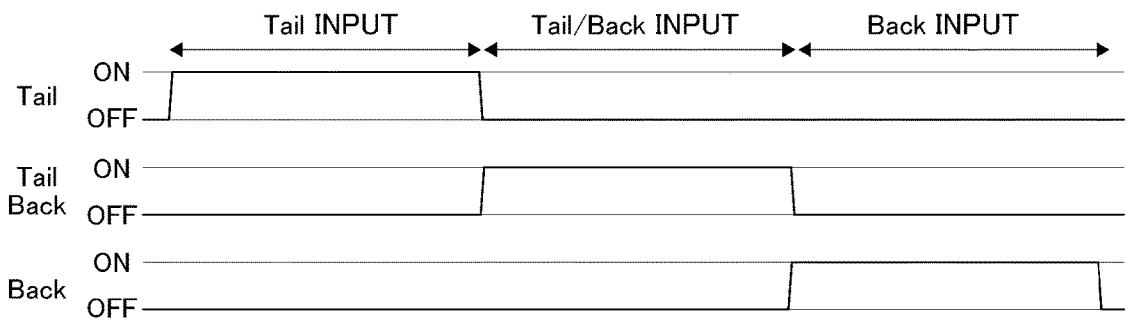
FIG. 9A is a view showing an example of a waveform obtained by a left lighting tool for a vehicle according to the second embodiment.
Figure 9B:
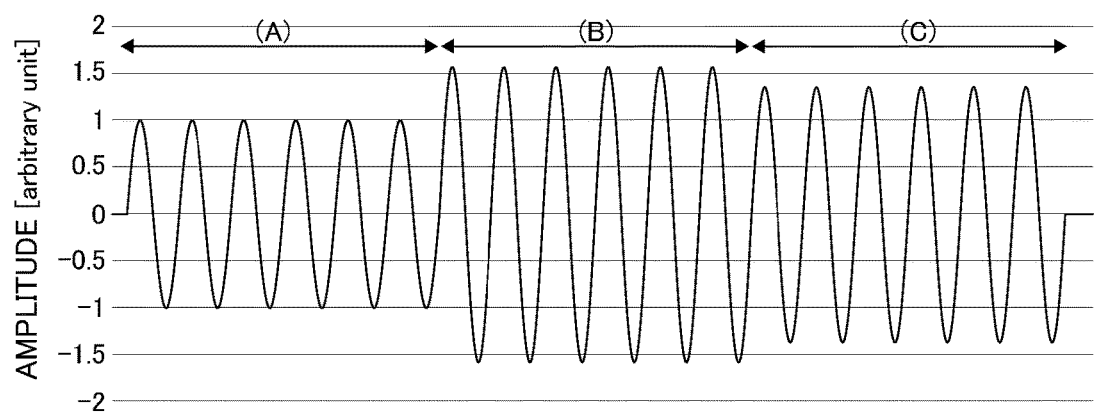
FIG. 9B is a view showing an example of the waveform obtained by the left lighting tool for a vehicle according to the second embodiment.
Figure 9C:
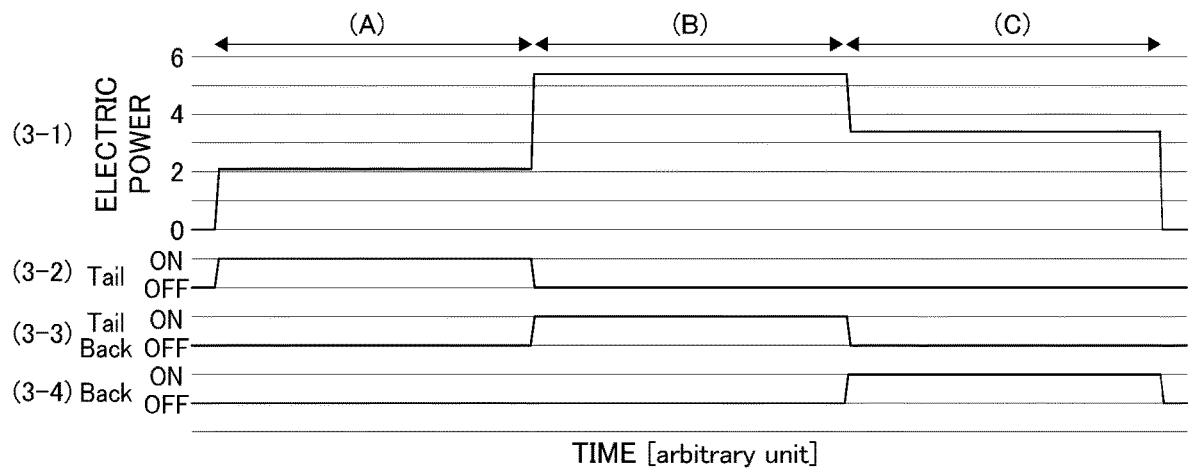
FIG. 9C is a view showing an example of the waveform obtained by the left lighting tool for a vehicle according to the second embodiment.

FIG. 9A to FIG. 9C are views showing an example of a waveform obtained by the left lighting tool 100aL for a vehicle according to the second embodiment. FIG. 9A is a view showing an example of waveform output from the detection unit 103L. An upper part of FIG. 9A shows an example of a waveform of electric power output from the detection unit 103L when the electric power is supplied from the tail lamp power supply TPSL. A middle part of FIG. 9A shows an example of a waveform of electric power output from the detection unit 103L when electric power is supplied from the tail lamp power supply TPSL and the back lamp power supply BPSL. A lower part of FIG. 9A shows an example of a waveform of electric power output from the detection unit 103L when electric power is supplied from the back lamp power supply BPSL.

According to FIG. 9A, each of the waveform of the electric power supplied from the back lamp power supply BPSL, the waveform of the electric power supplied from the tail lamp power supply TPSL and the back lamp power supply BPSL and the waveform of the electric power supplied from the tail lamp power supply TPSL is expressed as a rectangular wave, the electric power supplied in the case of these being in a low state is represented as OFF and the electric power supplied in the case of these being in a high state is represented as ON. The waveform of the electric power supplied from the back lamp power supply BPSL, the waveform of the electric power supplied from the tail lamp power supply TPSL and the back lamp power supply BPSL and the waveform of the electric power supplied from the tail lamp power supply TPSL have different timings in which they are in high state. Description returning to FIG. 8 will be continued.

An example of the generation unit 104aL is constituted by a PWM circuit. The generation unit 104L is connected to the detection unit 103L by a first conducting wire through which a waveform of electric power supplied from the back lamp power supply BPSL and the tail lamp power supply TPSL is transmitted, a second conducting wire through which a waveform of electric power supplied from the back lamp power supply BPSL is transmitted, and a third conducting wire through which a waveform of electric power supplied from the tail lamp power supply TPSL is transmitted. The generation unit 104L is synchronized with the detection unit 103L. The generation unit 104aL generates a first control signal that turns on either one or both of the left back lamp 22L and the left tail lamp 21L on the basis of any one of the waveform of the electric power supplied from the back lamp power supply BPSL output from the detection unit 103L, the waveform of the electric power supplied from the tail lamp power supply TPSL and the back lamp power supply BPSL and the waveform of the electric power supplied from the tail lamp power supply TPSL. An example of the first control signal is a rectangular wave.

Specifically, the generation unit 104aL generates a first control signal having a first amplitude and configured to turn on the left back lamp 22L and the left tail lamp 21L when the waveform of the electric power supplied from the back lamp power supply BPSL and the tail lamp power supply TPSL output from the detection unit 103L is acquired. An example of the first amplitude is 100 V. A duty ratio of the generated first control signal may be 50%. In addition, the generation unit 104L generates a first control signal having a second amplitude and configured to turn on the left back lamp 22L when the waveform of the electric power supplied from the back lamp power supply BPSL output from the detection unit 103L is acquired. An example of the second amplitude is 80 V. A duty ratio of the generated first control signal may be 40%. In addition, the generation unit 104L generates a first control signal having a third amplitude and configured to turn on the left tail lamp 21L when the waveform of the electric power supplied from the tail lamp power supply TPSL output from the detection unit 103L is detected.

An example of the third amplitude is 60 V. A duty ratio of the generated first control signal may be 30%. The first control signal has a frequency component close to the resonant frequency of the left power transmission apparatus 120aL. Here, as an example, description of the case in which the first control signal has a frequency component of 315 kHz will be continued.

The output control circuit 105aL is connected to the diode 101L, the diode 102L and the generation unit 104aL. The output control circuit 105aL is synchronized with the generation unit 104aL. Any one or both of the electric power supplied from the back lamp power supply BPSL output from the diode 101L and electric power supplied from the tail lamp power supply TPSL output from the diode 102L are superimposed on the first control signal output from the generation unit 104aL. Specifically, the output control circuit 105aL superimposes both of the electric power supplied from the back lamp power supply BPSL output from the diode 101L and the electric power supplied from the tail lamp power supply TPSL output from the diode 102L on the first control signal having the first amplitude and configured to turn on the left back lamp 22L and the left tail lamp 21L. In addition, the output control circuit 105aL superimposes the electric power supplied from the back lamp power supply BPSL output from the diode 101L on the first control signal having the second amplitude and configured to turn on the left back lamp 22L. In addition, the output control circuit 105aL superimposes the electric power supplied from the tail lamp power supply TPSL output from the diode 102L on the first control signal having the third amplitude and configured to turn on the left tail lamp 21L.

The output control circuit 105aL supplies the signal obtained by superimposition to the series resonance circuit (the power transmission section) including the condenser 106L and the coil 107L.

The series resonance circuit (the power transmission section) is connected to the output control circuit 105aL. The series resonance circuit (the power transmission section) transmits the signal supplied from the output control circuit 105aL.

FIG. 9B is a view showing an example of a waveform output from the output control circuit 105aL. In FIG. 9B, part (A) is a first control signal that turns on the left tail lamp 21L. The amplitude of the first control signal shown in part (A) in FIG. 9B is about 1 [arbitrary unit]. Part (B) in FIG. 9B is a first control signal that turns on the left back lamp 22L and the left tail lamp 21L.

The amplitude of the first control signal shown in part (B) in FIG. 9B is about 1.5 [arbitrary unit]. Part (C) in FIG. 9B is a first control signal that turns on the left back lamp 22L. The amplitude of the first control signal shown in part (C) in FIG. 9B is about 1.25 [arbitrary unit].

According to FIG. 9B, the first control signal shown in part (A) in FIG. 9B, the first control signal shown in part (B) in FIG. 9B and the first control signal shown in part (C) in FIG. 9B are expressed as sine waves and have different amplitudes. Returning to FIG. 8, description will be continued.

The resonant frequency f0 of the series resonance circuit is expressed as the above-mentioned equation (1) when a static capacitance of the condenser 106L is L and an inductance of the coil 107L is C.

Here, description of the case in which the resonant frequency f0 is 300 kHz will be continued.

Since the impedance is extremely low because the signal obtained by superimposing the electric power supplied from the back lamp power supply BPSL and the tail lamp power supply TPSL on the first control signal having the first amplitude output from the generation unit 104aL has a frequency component close to the resonant frequency, a large current can flow through the coil 107L. Accordingly, the series resonance circuit can generate a large magnetic flux even when the amplitude of the electric power supplied from the back lamp power supply BPSL and the tail lamp power supply TPSL is not large. In this case, the transmitted electric power is 6 W.

In addition, since the impedance is extremely low because the signal obtained by superimposing the electric power supplied from the back lamp power supply BPSL on the first control signal having the second amplitude output from the generation unit 104L has a frequency component close to the resonant frequency, a large current can flow through the coil 107L. Accordingly, the series resonance circuit can generate a large magnetic flux even when the amplitude of the electric power supplied from the back lamp power supply BPSL and the tail lamp power supply TPSL is not large. In this case, the transmitted electric power is 4 W.

In addition, since the impedance is extremely low because the signal obtained by superimposing the electric power supplied from the tail lamp power supply TPSL on the first control signal having the third amplitude output from the generation unit 104L has a frequency component close to the resonant frequency, a large current can flow through the coil 107L. Accordingly, the series resonance circuit can generate a large magnetic flux even when the amplitude of the electric power supplied from the back lamp power supply BPSL and the tail lamp power supply TPSL is not large. In this case, the transmitted electric power is 3 W.

(Left Power Receiving Apparatus 130aL)

The left power receiving apparatus 130aL includes the coil 108L, the condenser 109L, the power receiving circuit 110L, a conversion unit 111aL, the control unit 112L, the control unit 113L, the left tail lamp 21L and the left back lamp 22L.

The conversion unit 111aL is connected to the series resonance circuit (the power receiving section). The conversion unit 111aL is configured to include an A/D conversion circuit or the like. The conversion unit 111aL converts the signal (the high frequency voltage) output from the series resonance circuit (the power receiving section) into a direct current voltage, and converts the signal obtained by conversion to the direct current voltage into a digital signal. The conversion unit 111aL determines whether any one of the first control signal that turns on the left back lamp 22L and the left tail lamp 21L, the first control signal that turns on the left back lamp 22L and the first control signal that turns on the left tail lamp 21L is included in the signal transmitted from the left power transmission apparatus 120aL on the basis of the signal obtained by conversion to the digital signal.

Specifically, the conversion unit 111aL generates a second control signal instructing to turn ON the left tail lamp 21L and the left back lamp 22L and outputs the generated second control signal to the control unit 112L and the control unit 113L when the amplitude of the signal obtained by conversion to the digital signal is the first amplitude.

In addition, the conversion unit 111aL generates a second control signal instructing to turn ON the left back lamp 22L and outputs the generated second control signal to the control unit 113L when the amplitude of the signal obtained by conversion to the digital signal is the second amplitude.

In addition, the conversion unit 111aL generates a second control signal instructing to turn ON the left tail lamp 21L and outputs the generated second control signal to the control unit 112L when the amplitude of the signal obtained by conversion to the digital signal is the third amplitude.

FIG. 9C is a view showing an example of a waveform obtained by the conversion unit 111aL and a waveform output therefrom. In FIG. 9C, part (3-1) shows a signal obtained by converting the signal (the high frequency voltage) output from the series resonance circuit (the power receiving section) into a direct current voltage and converting the signal obtained by conversion to the direct current voltage into a digital signal. In the signal shown in part (3-1) in FIG. 9C, since part (A) has a third amplitude, part (A) is a signal that turns on the left tail lamp 21L. The third amplitude of the signal shown in part (A) in FIG. 9C is 2 V. Since part (B) in FIG. 9C has a first amplitude, part (B) is a signal that turns on the left back lamp 22L and the left tail lamp 21L. The first amplitude of the signal shown in part (B) in FIG. 9C is 5.5 V. Since part (C) in FIG. 9C has a second amplitude, part (C) is a signal that turns on the left back lamp 22L. The second amplitude of the signal shown in part (C) in FIG. 9C is 3.5 V.

According to part (3-1) in FIG. 9C, since the signal that turns on the left tail lamp 21L, the signal that turns on the left back lamp 22L and the left tail lamp 21L and the signal that turns on the left back lamp 22L have different amplitudes of about 1.5 V to 2 V, the first control signal can be recognized.

In the related art, when the signal on which the electric power is superimposed is converted, the signal needs to vary a voltage at a level lower than that of the transmission voltage. For this reason, the detection level width is narrowed, and it is more susceptible to external fluctuation such as a positional deviation between the coils, or the like, or external noise. In the second embodiment, since the detection level width can be made to be the same as the transmission voltage, it is difficult to be affected by external fluctuation or external noise.

In FIG. 9C, parts (3-2), (3-3) and (3-4) show an example of the second control signal. The conversion unit 111aL generates a second control signal that turns on the left tail lamp 21L shown in part (3-2) when the signal that turns on the left tail lamp 21L shown in part (A) of (3-1) in FIG. 9C is acquired by converting the signal (the high frequency voltage) output from the series resonance circuit (the power receiving section) into a direct current voltage and converting the signal obtained by conversion to the direct current voltage into a digital signal.

In addition, the conversion unit 111aL generates a second control signal that turns on the left back lamp 22L and the left tail lamp 21L shown in part (3-3) when the signal that turns on the left back lamp 22L and the left tail lamp 21L shown in part (B) of (3-1) in FIG. 9C is acquired by converting the signal (the high frequency voltage) output from the series resonance circuit (the power receiving section) into a direct current voltage and converting the signal obtained by conversion to the direct current voltage into a digital signal.

In addition, the conversion unit 111aL generates a second control signal that turns on the left back lamp 22L shown in part (3-4) when the signal that turns on the left back lamp 22L shown in part (C) of (3-1) in FIG. 9C is acquired by converting the signal (the high frequency voltage) output from the series resonance circuit (the power receiving section) into a direct current voltage and converting the signal obtained by conversion to the direct current voltage into a digital signal.

According to parts (3-2), (3-3) and (3-4) in FIG. 9C, the waveform of the second control signal that turns on the left tail lamp 21L, the waveform of the second control signal that turns on the left back lamp 22L and the left tail lamp 21L and the waveform of the second control signal that turns on the left back lamp 22L are expressed as rectangular waves, the left tail lamp 21L and the left back lamp 22L are turned OFF in the case of these being in a low state, and either one or both of the left tail lamp 21L and the left back lamp 22L are turned ON in the case of these being in a high state.

The waveform of the second control signal that turns on the left tail lamp 21L, the waveform of the second control signal that turns on the left back lamp 22L and the left tail lamp 21L and the waveform of the second control signal that turns on the left back lamp 22L have different timings in which they are in high state. Description returning to FIG. 8 will be continued.

The control unit 112L is connected to the conversion unit 111aL, the left tail lamp 21L and the power receiving circuit 110L. The control unit 112L is synchronized with the conversion unit 111aL. The control unit 112L controls the left tail lamp 21L according to the second control signal output from the conversion unit 111aL. Specifically, the control unit 112L turns on the left tail lamp 21L by applying a voltage output from the power receiving circuit 110L to the left tail lamp 21L when the second control signal indicates ON and turns off the left tail lamp 21L when the second control signal indicates OFF.

The control unit 113L is connected to the conversion unit 111aL, the left tail lamp 21L and the power receiving circuit 110L. The control unit 113L is synchronized with the conversion unit 111L. The control unit 112L controls the left back lamp 22L according to the second control signal output from the conversion unit 111aL. Specifically, the control unit 113L turns on the left back lamp 22L by applying a voltage output from the power receiving circuit 110L to the left back lamp 22L when the second control signal indicates ON and turns off the left back lamp 22L when the second control signal indicates OFF.

[Operation of Lighting Tool for a Vehicle]

FIG. 10 is a sequence chart showing an example of an operation of the lighting tool for a vehicle according to the second embodiment. In the sequence chart shown in FIG. 10, the case in which a driver in the automobile 1a performs either one or both of an operation of turning on the left back lamp 22L and an operation of turning on the left tail lamp 21L with respect to the automobile 1a will be described.

Step S11 to step S12 can apply step S1 to step S2 described with reference to FIG. 7.

(Step S13)

The generation unit 104L of the left power transmission apparatus 120L generates any one of a first control signal having a first amplitude and configured to turn on the left back lamp 22L and the left tail lamp 21L, a first control signal having a second amplitude and configured to turn on the left back lamp 22L and a first control signal having a third amplitude and configured to turn on the left tail lamp 21L on the basis of any one of the waveform of the electric power supplied from the back lamp power supply BPSL output from the detection unit 103L, the waveform of the electric power supplied from the tail lamp power supply TPSL and the back lamp power supply BPSL and the waveform of the electric power supplied from the tail lamp power supply TPSL.

Step S14 to step S16 can apply step S4 to step S6 described with reference to FIG. 7.

(Step S17)

The conversion unit 111aL of the left power receiving apparatus 130L converts the signal (the high frequency voltage) output from the series resonance circuit (the power receiving section) into a direct current voltage and converts the signal obtained by conversion to the direct current voltage into a digital signal.

Step S18 to step S19 can apply step S8 to step S9 described with reference to FIG. 7.

In the above-mentioned second embodiment, while the case in which the signal obtained by converting the signal (the high frequency voltage) output from the series resonance circuit (the power receiving section) into a direct current voltage and converting the signal obtained by conversion to the direct current voltage into a digital signal differs from about 1.5 V to 2 V according to the frequency has been described, there is no limitation thereto. For example, the signal may be smaller than 1.5 V or may be larger than 2 V as long as the voltage can be recognized by the conversion unit 111aL.

In the above-mentioned second embodiment, while the case in which lighting of either one or both of the left tail lamp 21L and the left back lamp 22L is controlled has been described, there is no limitation thereto. The lamp configured to control lighting is not limited to two types, and the lamp may be one type or may be three types or more.

In the above-mentioned second embodiment, while the case in which each of the left lighting tool 100aL for a vehicle and the right lighting tool 100aR for a vehicle includes the tail lamp power supply TPSL and the back lamp power supply BPSL has been described, there is no limitation thereto. For example, the tail lamp power supply TPSL and the back lamp power supply BPSL may be shared by the left lighting tool 100L for a vehicle and the right lighting tool 100R for a vehicle.

In the above-mentioned second embodiment, while the case in which the left power transmission apparatus 120aL includes the left rear combination lamp 17L, the left power receiving apparatus 130aL includes the left LID lamp 18L, and either one or both of the left tail lamp 21L and the left back lamp 22L of the left LID lamp 18L included in the left power receiving apparatus 130aL are turned on has been described, there is no limitation thereto. For example, a configuration in which the left power transmission apparatus 120aL includes the left LID lamp 18L, the left power receiving apparatus 130aL includes the left rear combination lamp 17L, and either one or both of the left turn light 19L and the left tail/stop lamp 20L of the left rear combination lamp 17L included in the left power receiving apparatus 130aL are turned on may be provided. A right power transmission apparatus 120aR and the right power receiving apparatus 130aR are also similar thereto.

In the above-mentioned first embodiment, while the case in which either one or both of the left turn light 19L and the left tail/stop lamp 20L included in the left rear combination lamp 17L are turned on in the left taillight section 11L and the case in which either one or both of the right turn light 19R and the right tail/stop lamp 20R included in the right rear combination lamp 17R are turned on in the right taillight section 11R have been described, there is no limitation thereto. For example, it is applicable not only to the taillight but also switching the lighting of the plurality of lamps in the left headlight section 10L and the right headlight section 10R.

According to the lighting tool for a vehicle of the second embodiment, when an operation of turning on either one or both of the left tail lamp 21L and the left back lamp 22L is performed, the left power transmission apparatus 120aL superimposes either one or both of the electric power supplied from the back lamp power supply BPSL and the electric power supplied from the tail lamp power supply TPSL on the first control signal having different amplitudes (voltages) generated according to the operation, and transmits the signal obtained by superimposition to the left power receiving apparatus 130aL. According to the above-mentioned configuration, the left power transmission apparatus 120aL can transmit the first control signal using a simple configuration without preparing additional parts required when infrared communication or Bluetooth is used. In addition, when the signal is transmitted from the power transmission side to the power receiving side through wireless power supply, the waveform obtained on the power receiving side coil is not in a perfect shape. In addition, a voltage value is not constant since the distance between the coils varies due to mass production variations or the like. For this reason, when electric power line carrier communication is used, there is a problem in operation stability on an output side. In addition, when electric power line carrier communication is used, an influence from external noise is also increased. The left power transmission apparatus 120aL can reduce the electric power loss because the first control signal is less susceptible to external fluctuation such as a positional deviation or the like between the coils or external noise.

The left power receiving apparatus 130aL receives the signal transmitted from the left power transmission apparatus 120aL, converts the received signal into a direct current voltage in proportion to a frequency of a pulse, and converts the signal obtained by conversion to the direct current voltage into a digital signal. The left power receiving apparatus 130aL generates a second control signal on the basis of the digital signal, and turns on either one or both of the left tail lamp 21L and the left back lamp 22L on the basis of the generated second control signal. According to the above-mentioned configuration, the left power receiving apparatus 130aL can select a frequency on the basis of the digital signal obtained from the received signal, and generate a second control signal from the selected frequency.

Configuration Example

As a configuration example, in a lighting tool for a vehicle (in the embodiment, the left lighting tool 100aL for a vehicle, the right lighting tool 100aR for a vehicle) including a first power supply (in the embodiment, the back lamp power supply BPSL, the tail lamp power supply TPSL) mounted on a vehicle (in the embodiment, the automobile 1a), and a lamp for a vehicle (the left back lamp 22L, the left tail lamp 21L) attached to the vehicle and operated with electric power supplied from the first power supply, the lighting tool for a vehicle includes the lamp for a vehicle, a detection unit configured to detect a waveform of first electric power supplied from the first power supply, a generation unit configured to generate a first control signal that is a signal to control the lamp for a vehicle according to the waveform of the first electric power detected by the detection unit, an output control unit (in the embodiment, the output control circuit 105aL) configured to superimpose the first control signal generated by the generation unit on the first electric power supplied from the first power supply and wirelessly transmit the signal obtained by the superimposition from a power transmission section (in the embodiment, a series resonance circuit including the condenser 106L and the coil 107L), a conversion unit provided on the lamp for a vehicle and configured to acquire a second control signal based on the signal received by a power receiving section (in the embodiment, a series resonance circuit including the condenser 109L and the coil 108L) configured to receive the signal wirelessly transmitted from the power transmission section, and a lamp control unit (in the embodiment, the control unit 112L, the control unit 113L) configured to control the lamp for a vehicle according to the second control signal acquired by the conversion unit.

As a configuration example, a second power supply (in the embodiment, the back lamp power supply BPSL, the tail lamp power supply TPSL) is provided, the detection unit detects either one or both of the waveform of the first electric power supplied from the first power supply and the waveform of the second electric power supplied from the second power supply, the generation unit generates a first control signal according to either one or both of the waveform of the first electric power and the waveform of the second electric power detected by the detection unit, and the output control unit superimposes the first control signal generated by the generation unit on either one or both of the first electric power and the second electric power.

As a configuration example, the output control unit generates a first control signal having different amplitudes according to either one or both of the waveform of the first electric power and the waveform of the second electric power detected by the detection unit.

As a configuration example, the output control unit generates a first control signal having an amplitude determined according to power consumption of the lamp for a vehicle.

Processing may be performed by recording a program configured to realize functions of an apparatus according to the above-mentioned embodiment (for example, the left power transmission apparatus 120L, the left power receiving apparatus 130L, the right power transmission apparatus 120R, the right power receiving apparatus 130R, the left power transmission apparatus 120aL, the left power receiving apparatus 130aL, the right power transmission apparatus 120aR, the right power receiving apparatus 130aR, or the like) on a computer-readable recording medium, reading the program recorded on the recording medium using a computer system and performing the program.

Further, "the computer system" disclosed herein may include an operating system (OS) or hardware such as peripheral devices or the like.

In addition, "the computer-readable recording medium" refers a rewritable non-volatile memory such as a flexible disk, a magneto-optic disk, a read only memory (ROM), a flash memory, or the like, a portable medium such as a digital versatile disc (DVD) or the like, a storage device such as a hard disk or the like installed in a computer system.

Further, "the computer-readable recording medium" is a medium configured to hold a program for a certain time such as a volatile memory (for example, a dynamic random access memory (DRAM)) in a computer system that is a server or a client when a program is transmitted via a communication line, for example, a network such as the Internet or the like or a telephone line.

In addition, the program may also be transmitted to another computer system from the computer system in which the program is stored on the storage device via a transmission medium or a transmission wave in the transmission medium. Here, "the transmission medium" that transmits the program refers a medium having a function of transmitting information, for example, a network (a communication network) such as the Internet or the like, or a communication line (a communication line) such as a telephone line or the like.

In addition, the program may be configured to realize some of the above-mentioned functions. Further, the program may be a so-called differential file (a differential program) capable of realizing the above-mentioned function by combining programs already recorded in the computer system.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lighting tool for a vehicle comprising:
    a first power source mounted on the vehicle for providing electric power;
    a lamp for the vehicle attached to the vehicle and operated with first electric power supplied from the first power source;
    a detection unit configured to detect a waveform of the first electric power supplied from the first power source;
    a generation unit configured to generate a first control signal that is a signal controlling the lamp for the vehicle according to the waveform of the first electric power detected by the detection unit;
    an output control unit configured to superimpose the first control signal generated by the generation unit on the first electric power supplied from the first power source and wirelessly transmit the signal obtained by the superimposition from a power transmission section;
    a conversion unit configured to acquire a second control signal based on the signal received by a power receiving section configured to receive the signal wirelessly transmitted from the power transmission section provided on the lamp for the vehicle; and
    a lamp control unit configured to control the lamp for the vehicle according to the second control signal acquired by the conversion unit.

2. The lighting tool for a vehicle according to claim 1, wherein a second power source is provided,
    the detection unit detects either one or both of the waveform of the first electric power supplied from the first power source and a waveform of second electric power supplied from the second power source,
    the generation unit generates the first control signal according to either one or both of the waveform of the first electric power and the waveform of the second electric power detected by the detection unit, and
    the output control unit superimposes the first control signal generated by the generation unit on either one or both of the first electric power and the second electric power.

3. The lighting tool for a vehicle according to claim 2, wherein the output control unit generates a first control signal having different frequency components according to either one or both of the waveform of the first electric power and the waveform of the second electric power detected by the detection unit.

4. The lighting tool for a vehicle according to claim 3, wherein the output control unit generates first control information having a frequency component determined according to power consumption of the lamp for the vehicle.

5. The lighting tool for a vehicle according to claim 2, wherein the output control unit generates the first control signal having different amplitudes according to either one or both of the waveform of the first electric power and the waveform of the second electric power detected by the detection unit.

6. The lighting tool for a vehicle according to claim 5, wherein the output control unit generates the first control signal having an amplitude determined according to power consumption of the lamp for the vehicle.

7. An illumination system configured to operate a lamp for a vehicle using electric power supplied from a power-supply-power source mounted on the vehicle, the illumination system comprising:
    a detection unit configured to detect a waveform of electric power supplied from the power source;
    a generation unit configured to generate a first control signal that is a signal controlling the lamp for the vehicle according to the waveform of the electric power detected by the detection unit;
    an output control unit configured to superimpose the first control signal generated by the generation unit on the electric power supplied from the power source and wirelessly transmit the signal obtained by the superimposition from a power transmission section;
    a conversion unit configured to acquire a second control signal from the signal received by a power receiving section configured to receive the signal wirelessly transmitted from the power transmission section provided on the lamp for the vehicle; and
    a lamp control unit configured to control the lamp for the vehicle according to the second control signal acquired by the conversion unit.

8. A lamp control method performed by an illumination system configured to operate a lamp for the vehicle using electric power supplied from a power source mounted on the vehicle, the lamp control method comprising:
    detecting a waveform of electric power supplied from the power source;
    generating a first control signal that is a signal controlling the lamp for the vehicle according to the waveform of the electric power detected in the detecting step;
    superimposing the first control signal generated in the generating step on the electric power supplied from the power source;

wirelessly transmitting a signal obtained by the superimposing step;
receiving the signal wirelessly transmitted in the wirelessly transmitting step;
acquiring a second control signal based on the signal received in the receiving step; and
controlling the lamp for the vehicle according to the second control signal acquired by the acquiring step.

* * * * *